US008336818B2

(12) United States Patent
Flatt

(10) Patent No.: US 8,336,818 B2
(45) Date of Patent: *Dec. 25, 2012

(54) JAM TOLERANT ELECTROMECHANICAL ACTUATION SYSTEMS AND METHODS OF OPERATION

(75) Inventor: James E. Flatt, Foothill Ranch, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/928,508

(22) Filed: Oct. 30, 2007

(65) Prior Publication Data

US 2009/0108130 A1    Apr. 30, 2009

(51) Int. Cl.
  *B64C 13/24* (2006.01)
  *F16H 29/02* (2006.01)
(52) U.S. Cl. ............... 244/99.9; 244/99.2; 74/89.23; 74/89.38
(58) Field of Classification Search .......... 244/213, 244/76 A, 224, 227, 228, 99.2, 99.4, 99.9; 74/89.23, 89.39, 89.38
See application file for complete search history.

(56) References Cited

U.S. PATENT DOCUMENTS

| | | | |
|---|---|---|---|
| 3,958,779 A | 5/1976 | Townsend | 244/75 |
| 4,544,052 A | 10/1985 | Borden | 192/56 |
| 4,575,027 A | 3/1986 | Cronin | 244/75 |
| 4,608,527 A | 8/1986 | Glennon et al. | 318/685 |
| 4,637,272 A | 1/1987 | Teske et al. | 74/424.8 |
| 4,877,120 A | 10/1989 | Tysver et al. | 192/141 |
| 4,885,939 A | 12/1989 | Martin | 73/379 |
| 4,932,613 A | 6/1990 | Tiedeman et al. | 244/213 |
| 4,979,700 A | 12/1990 | Tiedeman et al. | 244/75 |
| 5,071,397 A | 12/1991 | Grimm | 475/263 |
| 5,120,285 A | 6/1992 | Grimm | 475/342 |
| 5,144,851 A * | 9/1992 | Grimm et al. | 74/89.26 |
| 5,214,972 A | 6/1993 | Larson et al. | |
| 5,518,466 A | 5/1996 | Tiedeman | 475/342 |
| 5,779,587 A | 7/1998 | Reilly | 475/263 |
| 5,947,246 A | 9/1999 | Koller | 192/56.1 |
| 6,231,012 B1 | 5/2001 | Cacciola et al. | 244/213 |
| 6,260,799 B1 | 7/2001 | Russ | 244/49 |

(Continued)

FOREIGN PATENT DOCUMENTS

GB    1393758    5/1975

OTHER PUBLICATIONS

PCT/US2008/053273; PCT International Search Report dated Jun. 5, 2009.
PCT/US2007/077507; Partial International Search mailed Jun. 15, 2009.

*Primary Examiner* — Joseph W Sanderson
(74) *Attorney, Agent, or Firm* — Renner, Otto, Boisselle & Sklar, LLP

(57) ABSTRACT

In a vehicle, having a fixed supporting structure and a load movable relative thereto, a jam tolerant actuating system, a method for controlling this system including: Locating a physical coupling/decoupling mechanism between the load and an actuator assembly as close a practicable to the load; constructing the coupling/uncoupling mechanism to be reversible, and hence testable; and controlling the connection/disconnection via decision making electronics which will detect any system failure by monitoring, at a minimum: actuator main motor load and speed, and actuator output load. Also set forth are specific embodiments of pivotable rotary geared actuators as well as linear ball screw type actuators embodying the coupling/uncoupling mechanisms of this invention.

20 Claims, 21 Drawing Sheets

U.S. PATENT DOCUMENTS

| | | |
|---|---|---|
| 6,443,034 B1 | 9/2002 | Capewell et al. ............... 74/665 |
| 6,705,570 B1 | 3/2004 | Degenholtz et al. ............ 244/75 |
| 6,860,452 B2 | 3/2005 | Bacon et al. .................. 244/194 |
| 7,100,870 B2 | 9/2006 | Flatt ............................. 244/99.2 |
| 2003/0015982 A1 | 1/2003 | Cox-Smith et al. ........... 318/433 |
| 2003/0127569 A1 | 7/2003 | Bacon et al. .................. 244/195 |
| 2004/0007923 A1 | 1/2004 | Tesar |
| 2006/0048602 A1 | 3/2006 | Biester |
| 2006/0113933 A1 | 6/2006 | Blanding et al. |

* cited by examiner

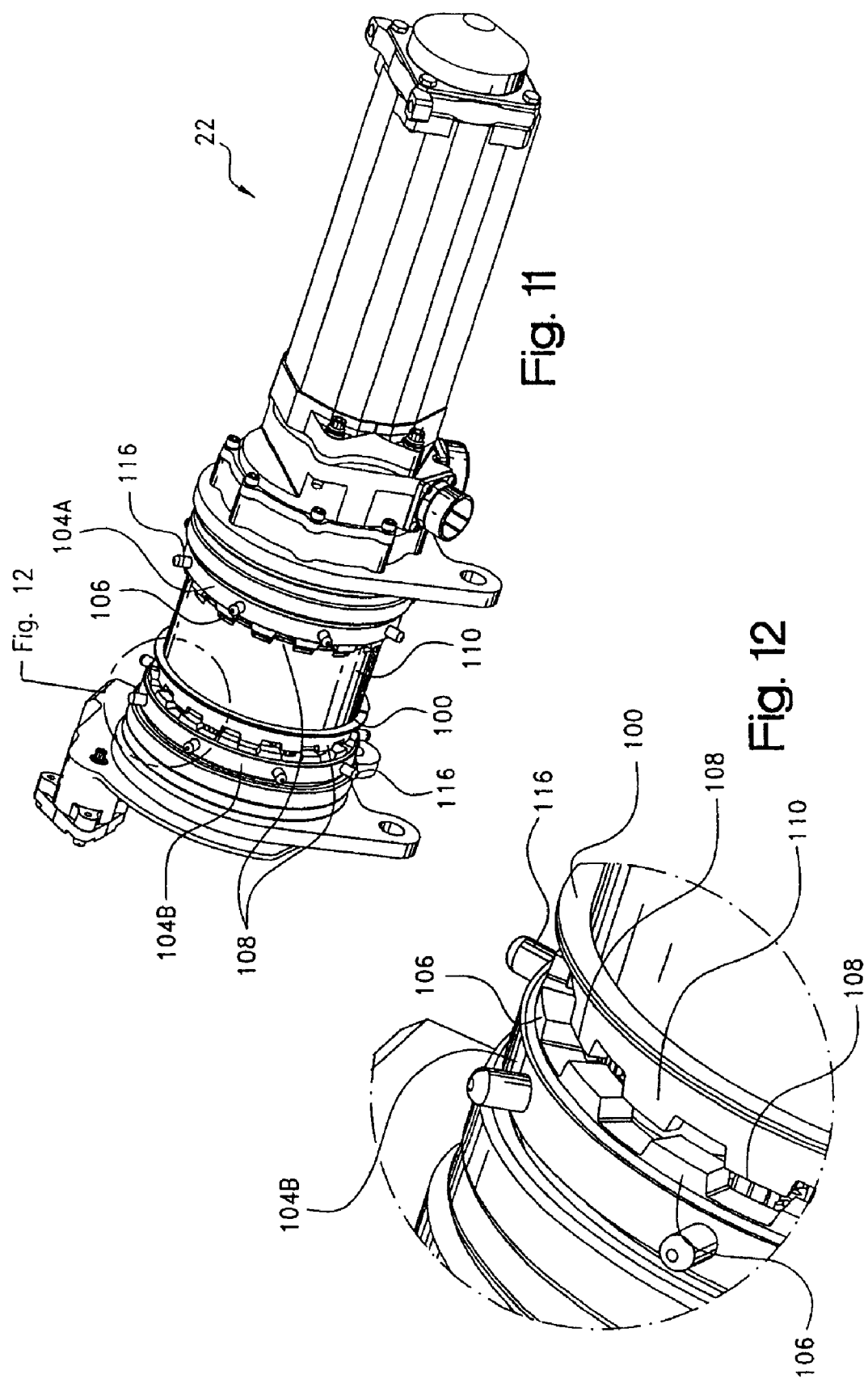

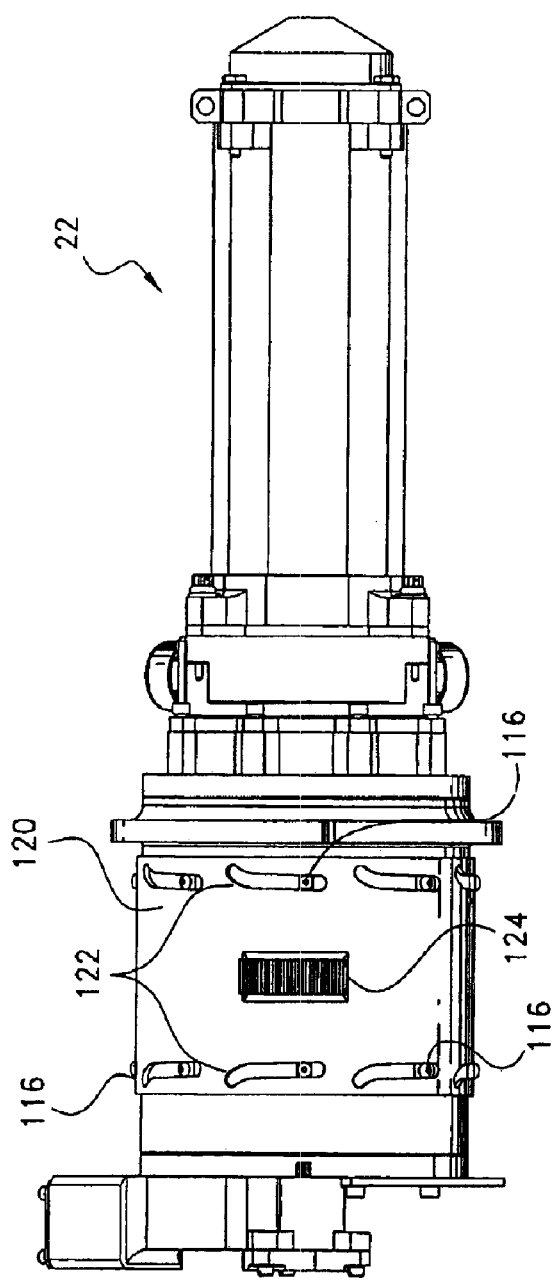
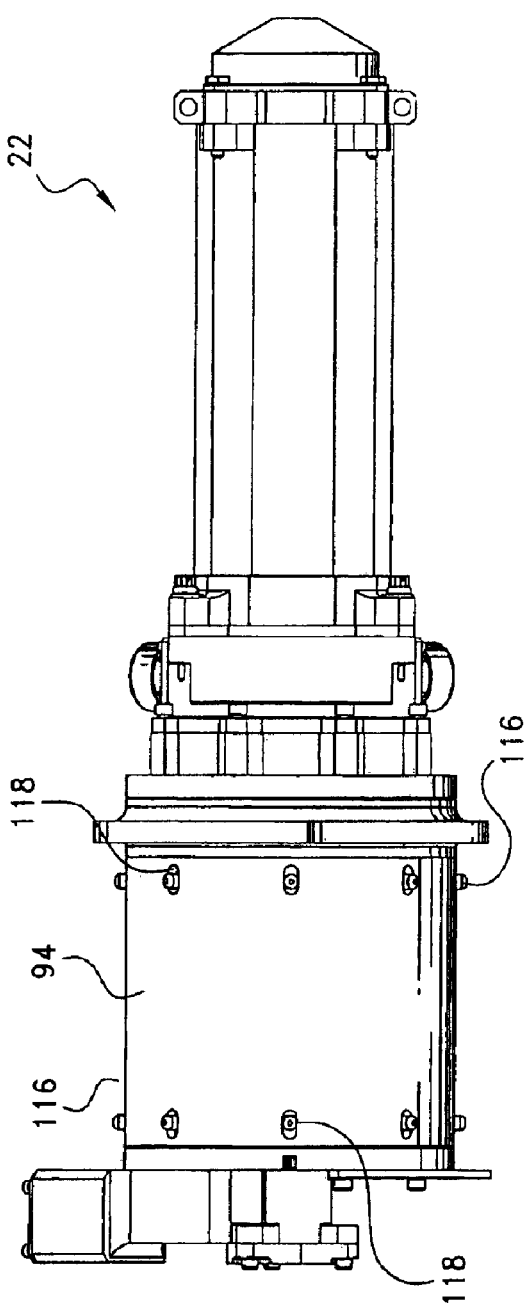

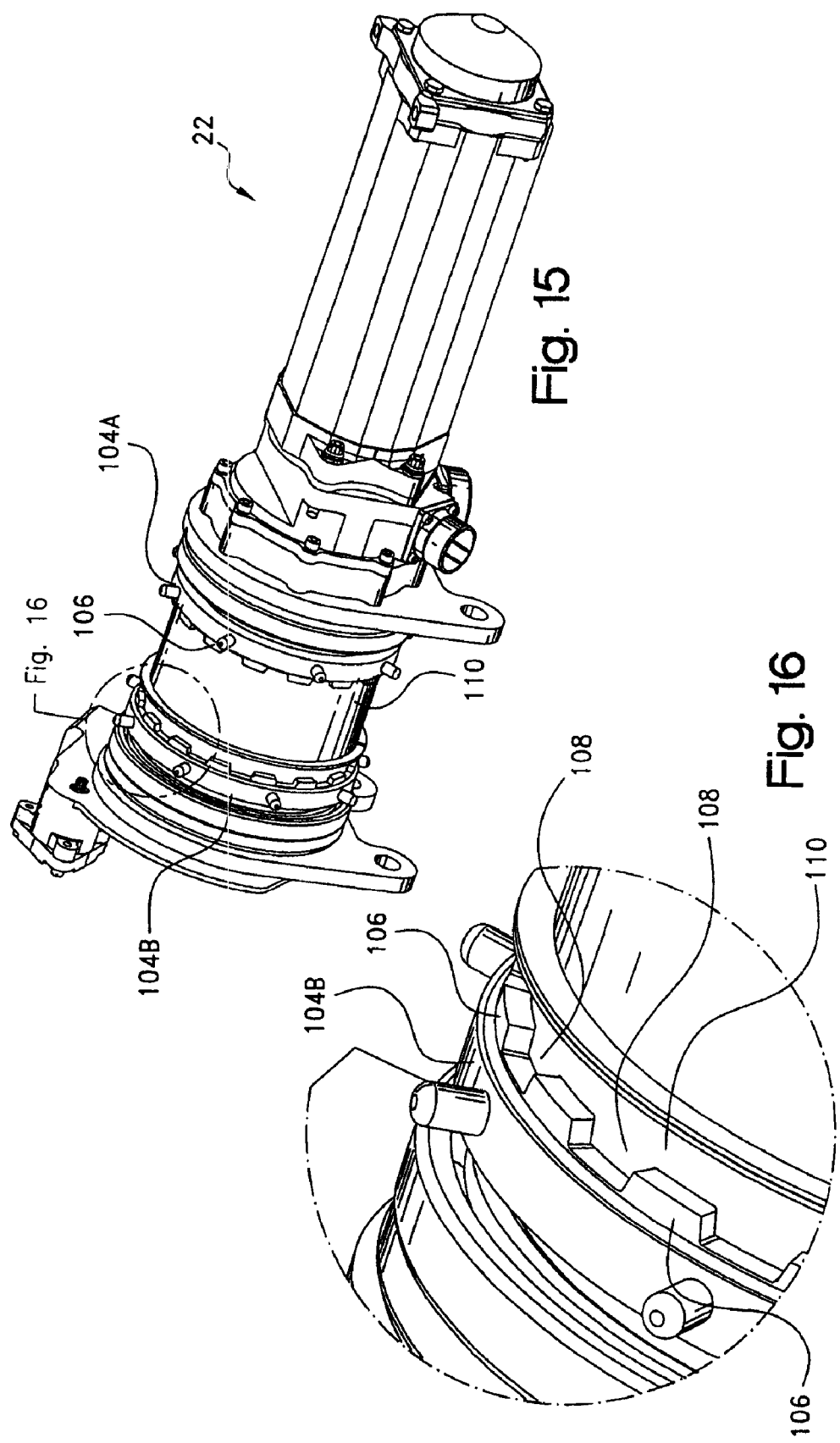

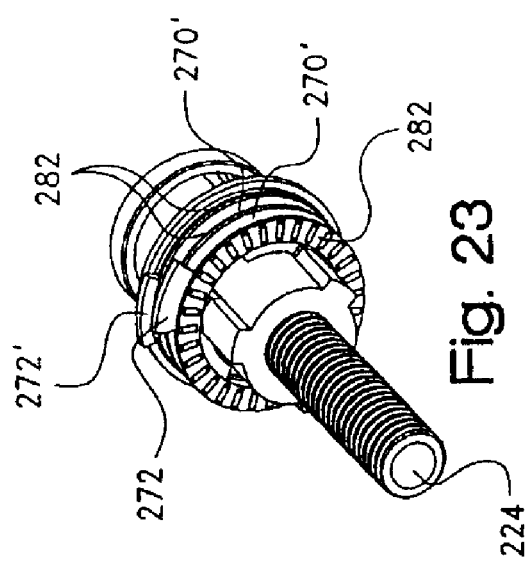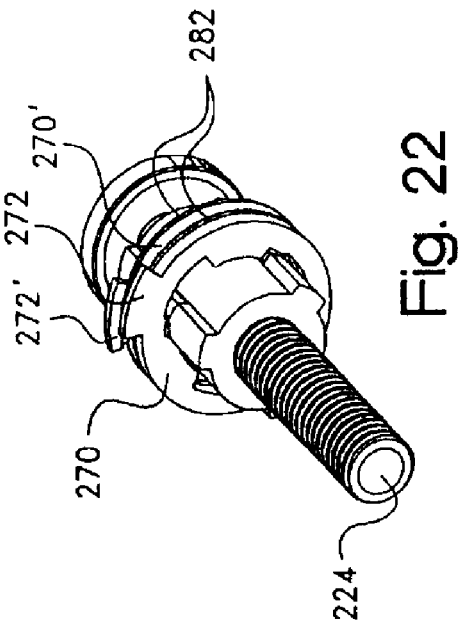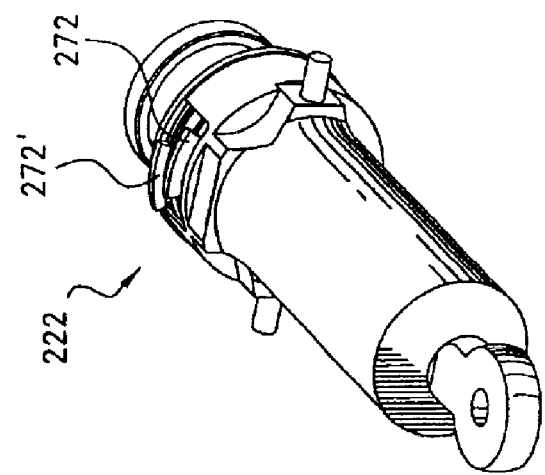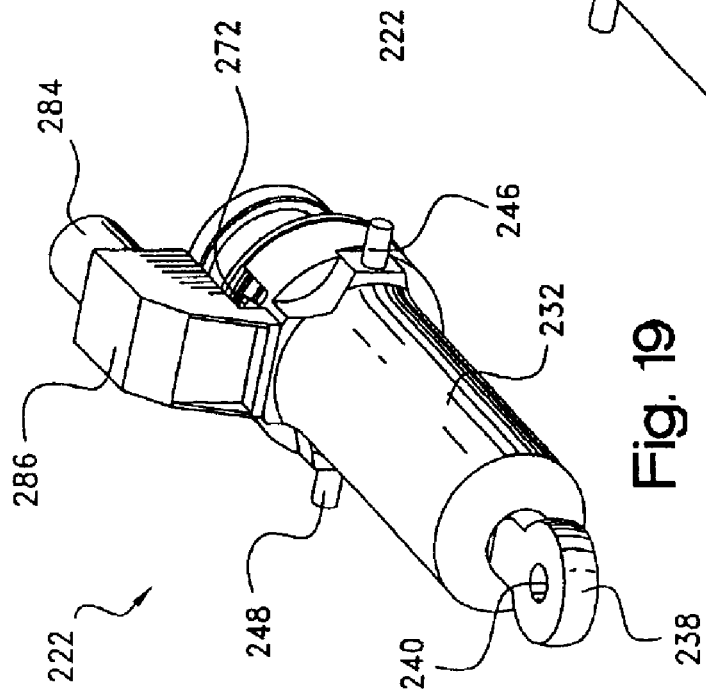

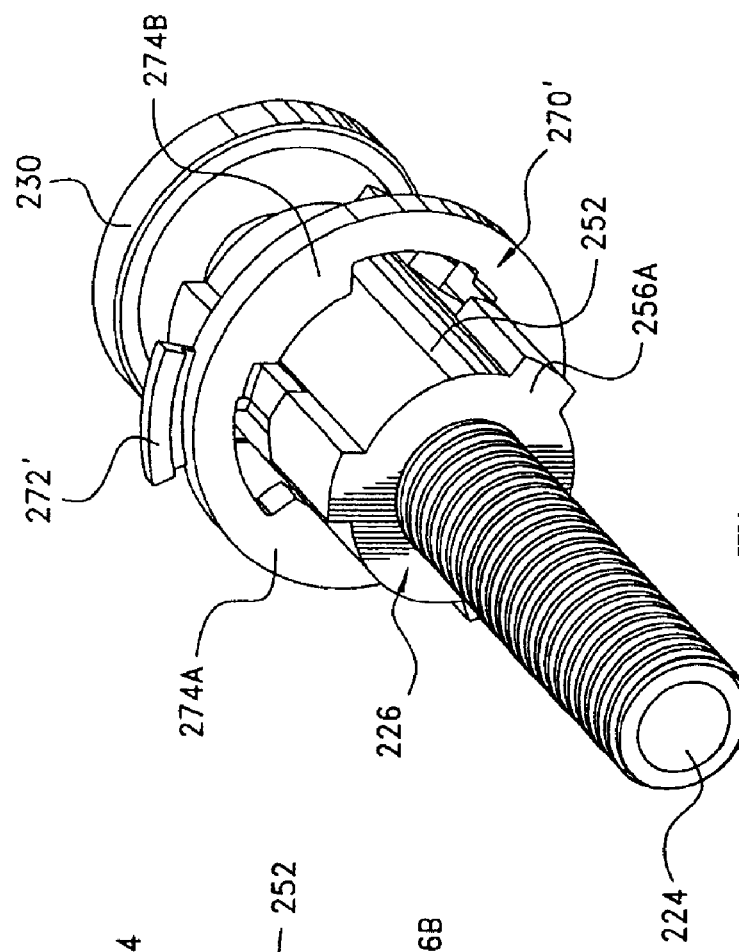
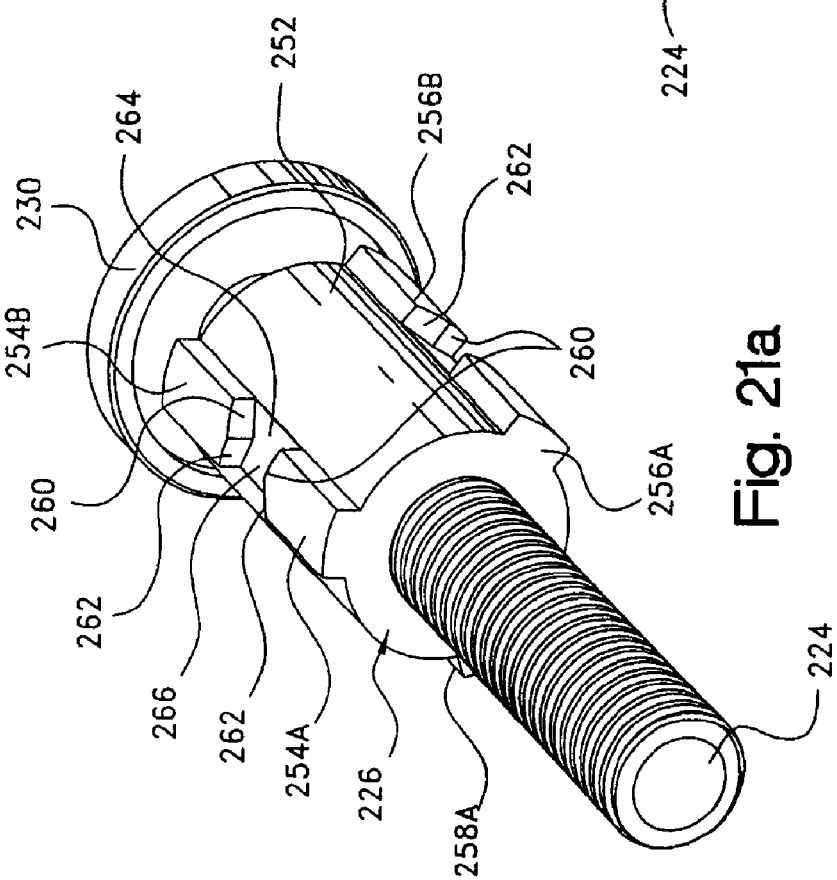

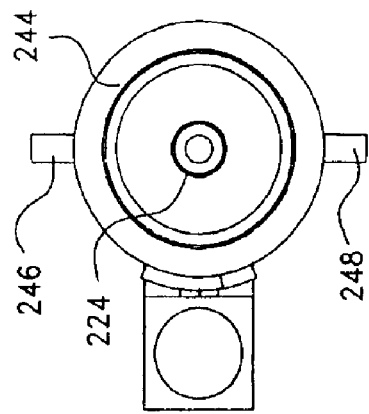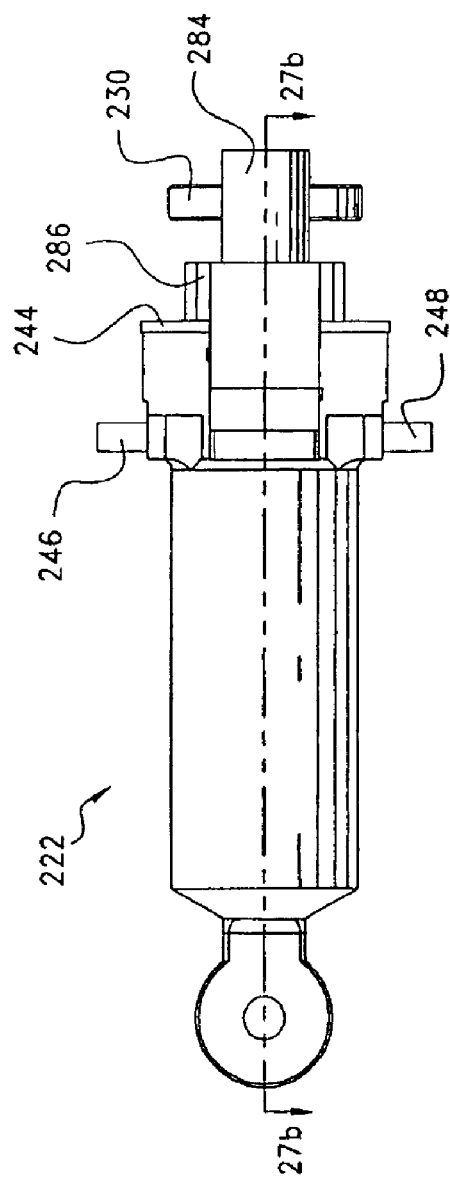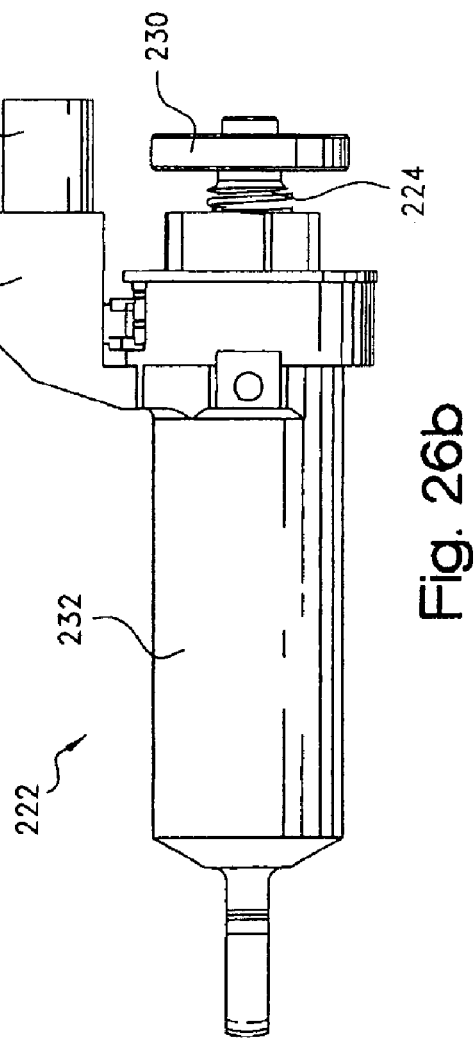

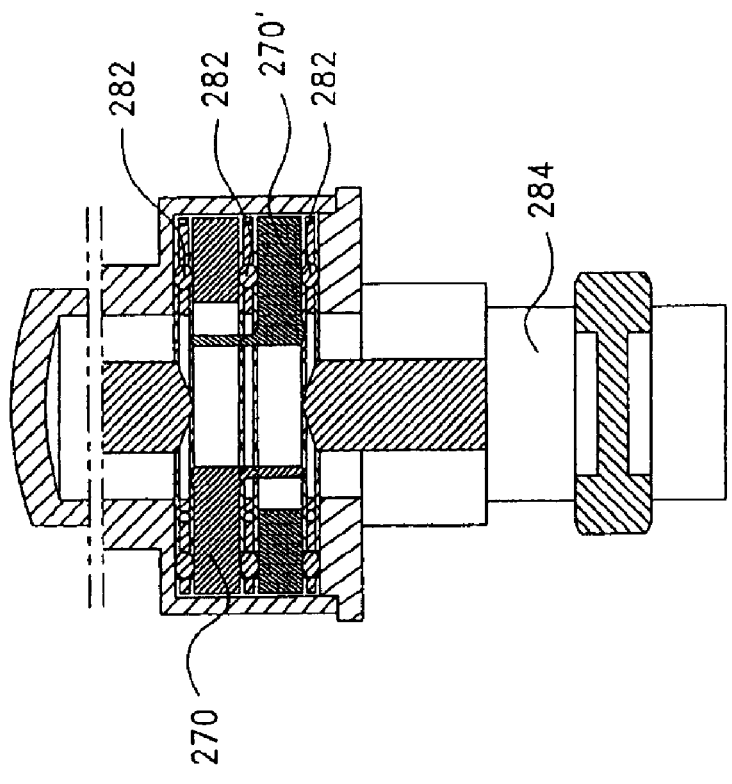
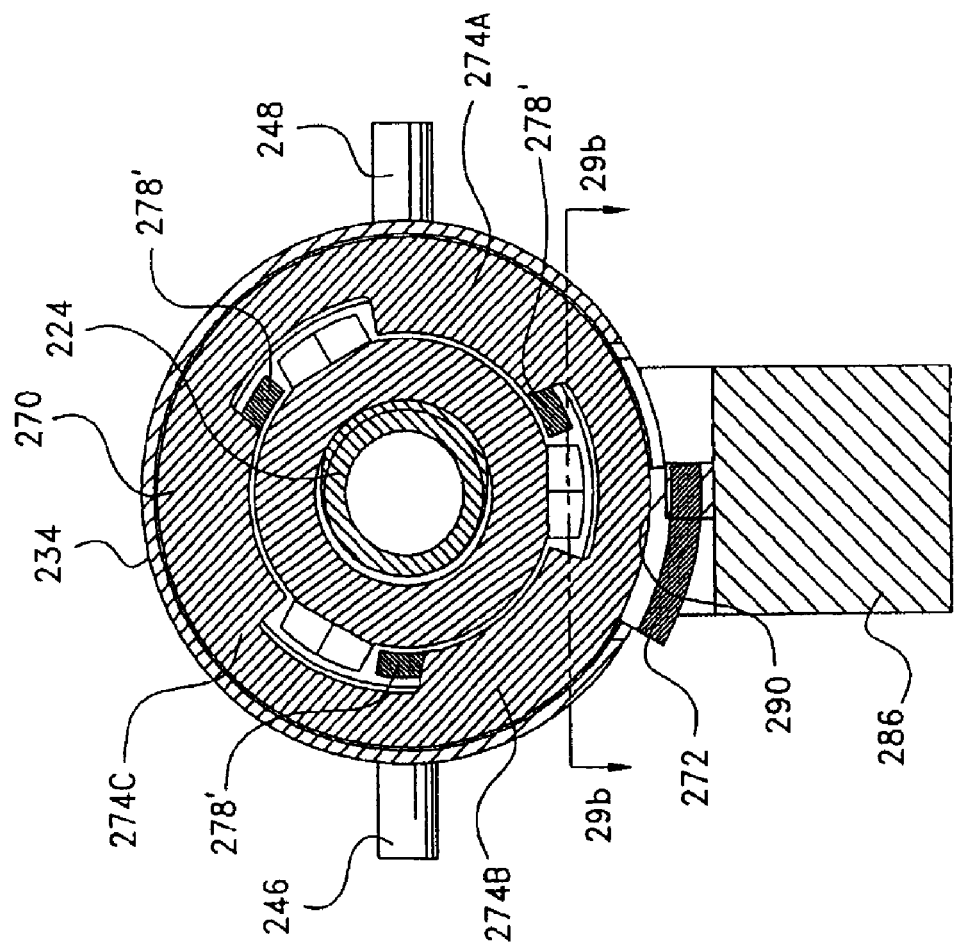

JAM TOLERANT ELECTROMECHANICAL ACTUATION SYSTEMS AND METHODS OF OPERATION

CROSS-REFERENCE TO RELATED CASES

The present application claims priority under 35 USC §120 to U.S. patent application Ser. No. 11/469,531 filed Sep. 1, 2006 which claims priority under 35 USC §120 to U.S. patent application Ser. No. 10/920,107 filed Aug. 17, 2004 which claimed priority under 35 USC §119(e) to U.S. Provisional Application No. 60/511,506 filed Oct. 15, 2003. The entire disclosures of these earlier applications are hereby incorporated by reference.

FIELD OF THE INVENTION

The present invention pertains to jam tolerant electromechanically operated actuation systems, of both the rotary and linear types, together with their methods of operation that can be universally utilized wherever such actuation systems are required, e.g., in vehicles, etc. Specifically, this invention pertains to electrical jam-detection systems and associated locking devices that can be electrically engaged and disengaged that do not require an overload to relieve the jam and that are testable since the process is completely reversible.

BACKGROUND OF THE INVENTION

One of the applications of the jam tolerant electromechanical actuation systems of this invention, among others, is for the actuation of thin wing stabilizers (both vertical and horizontal), ailerons, canards, rudders for manned and unmanned aircraft, marine, submarine, spacecraft, as well as ground vehicles and the like. This invention makes electromechanical actuators safer for primary flight control since it eliminates a mechanical jam potential in electromechanical actuators and thereby removes the last remaining technical obstacle that prevents electromechanical actuators from being used in primary flight control applications.

The patent literature includes a number of constructions that pertain to jam tolerant hinge line actuators, or other electromechanical actuators, that utilize frangible elements or other mechanisms to relieve a jam when an overload occurs. The patents listed below are merely representative of the prior art and are listed in chronological order as follows: U.S. Pat. No. 3,958,779 to Townsend; U.S. Pat. No. 4,544,052 to Borden; U.S. Pat. No. 4,637,272 to Teske et al.; U.S. Pat. No. 4,885,939 to Martin; U.S. Pat. No. 4,932,613 to Tiedeman et al.; U.S. Pat. No. 4,979,700 to Tiedeman et al.; U.S. Pat. No. 5,071,397 to Grimm; U.S. Pat. No. 5,518,466 to Tiedeman; U.S. Pat. No. 5,779,587 to Reilly; U.S. Pat. No. 5,947,246 to Koller; U.S. Pat. No. 6,231,012 B1 to Cacciola et al.; U.S. Pat. No. 6,260,799 B1 to Russ; U.S. Pat. No. 6,443,034 B1 to Capewell et al.; and U.S. Pat. No. 6,705,570 to Degenholtz et al. Several of these constructions will be discussed in more detail as follows:

Turning first to U.S. Pat. No. 3,958,779 to Townsed, pertains to jam tolerant surface control but not to a hinge line actuator. U.S. Pat. No. 4,932,613 to Tiedeman et al. incorporates a two slice hinge planetary mechanism which uses helical gearing to provide greater torque output for a given volume. The helix angles are opposite between left and right slices such that the thrust loads generated on these gears will act towards each other and ultimately cancel each other out. Thus there does not need to be any additional structure to carry the thrust loads. The structures of the present invention do not utilized opposing helical gears. U.S. Pat. No. 5,518,466 to Tiedeman achieves jam tolerance through the use of frangible elements at both the input and output of the hinge. Thus, a jammed hinge can be severed from the surface, allowing same to be driven by the remaining gear boxes, and the motor can be severed if a single motor is driving multiple gearboxes. None of the embodiments of the present invention use frangible elements.

U.S. Pat. No. 4,544,052 to Borden pertains to a coupling, rather than an actuator, that can be electrically disconnected, but must be manually reconnected. It entails the use of heavy compression springs to disconnect the load wherein these springs are released by electrically activating a small solenoid, allowing same to be disconnected quickly. Furthermore, this structure cannot be reconnected while the system is loaded or in motion. The design of the present invention permits both electrical connection and disconnection, both of which are achievable while the system is loaded and/or moving.

Continuing with U.S. Pat. No. 5,071,397 to Grimm, this design, similar to one of the embodiments of the present invention, also uses a hinge line planetary arrangement. However, the Grimm design has the disconnection occurring at the input shaft portion of the hinge line planetary. This feature does not allow the system to continue operating after a failure. The designs of the present invention use multiple actuators on a single surface. Thus, when one actuator fails (jammed or otherwise) it is removed from the system by disconnecting same and continuing operation with the remaining healthy actuator(s). If a jam occurred in the Grimm gear train, e.g., at the planet gear (item 2 in FIG. 1 thereof), while the input shaft would not be jammed, the output would be undesirably fixed in place. In the constructions of the present invention, the disconnection occurs at the point where the actuator couples to the load so that any jam anywhere in the actuator can be disconnected. In addition, in this Grimm device, the disconnecting mechanism is triggered automatically by an overload and will reset itself automatically when the overload is removed. The present invention uses electronics and software to continually monitor the system and evaluate same for unacceptable performance which may not necessarily manifest itself in an overload. When the decision is made to remove the actuator from the system, it is fully removed and cannot be re-engaged until commanded to (the system being stable in both the engaged and disengaged positions).

Turning now to U.S. Pat. No. 5,779,857 to Reilly, this design, similar to that of the present invention, disconnects at the actuator output. However, the Reilly disconnection is triggered by an overload of the input shaft. As already noted, an actuator failure may not always manifest itself as an overload and thus the Reilly design would not be tolerant of other types of failure. It should also be noted that even though the load is disconnected at the output, the overload sensing is at the input. Thus, if a failure occurred while the system was supposed to be dormant and holding a steady load, it would not disconnect if subjected to an excessive back driving load from the output. Only forward driving torque can activate the Reilly system. In addition, and differing from the structures of the present invention, it uses a frangible element to achieve the "jam-tolerant" mode. Frangible elements cannot be tested prior to use.

None of the noted prior art constructions utilize reversible disengagement without human intervention (testable on the vehicle) and the disengagement of the actuator from the load at or as close as is practicable to the output (closest to load). In addition, in the embodiments of the present invention, actuator fault (any type of failure or degradation is determined by monitoring, at a minimum, motor speed, motor load, and output load (with "motor" including any source of mechanical or hand power) and activating the electronically controlled disengagement mode.

SUMMARY OF THE INVENTION

Accordingly, in order to overcome the deficiencies of the prior art devices, the several embodiments of the present invention not only provide jam tolerant electromechanical actuating systems that permit physical disconnection between the load and the actuator as close as practicable to the load, but also permit the disconnection to be reversible and hence testable, with the disconnection being controlled by decision-making electronics which will detect any failure by monitoring, at a minimum of: main motor load, main motor speed and output load.

Specifically, in an aircraft, having a fixed supporting structure and a control surface movable relative thereto, a jam tolerant actuating system including a computer, control means and at least two electromechanical actuator assemblies, each of the actuator assemblies further including a main motor for providing motion force therefore; a load sensor and a position sensor on the actuator assembly; a coupling/decoupling mechanism, positioned at the output member of the actuator assembly, for severing the load path between the actuator assembly and the movable surface; and a disconnect actuator for providing motive force for the coupling/decoupling mechanism, a method for controlling the actuating system, comprising the steps of: operating the movable control surface by the actuator assembly via the main motor, as directed by the computer via Command and Power inputs through the control means; relaying, from the control means to the computer, a plurality of the following inputs; i. main motor speed from a main motor commutator; ii. main motor current; iii. actuator assembly output load from the load sensor; and iv. actuator assembly output position, processed to determine speed, from the position sensor; and completely severing, via decoupling, the load path between the actuator assembly and the movable surface, via driving the coupling/decoupling mechanism in one direction, upon the detection of a malfunction, as determined by the control means, based on at least three of the above i., ii., iii., and iv. inputs.

One variation thereof includes the further step of reversing the previous decoupling step, at any time, thereby reestablishing the load path, between the actuator assembly and the movable control surface, by driving the coupling/decoupling mechanism in a reverse direction. Another variation thereof further includes the steps of: indirectly measuring, via the load sensor, the load present or occurring at the output member of the actuator assembly; indirectly measuring, the actuator assembly input load; and comparing the input and output loads to detect if a jam or other type of failure has occurred within the actuator assembly or the control system.

In the above methods for controlling, the comparing of input and output loads may be limited to one of the actuating assemblies or used in conjunction with similar readings from additional, redundant, actuator assemblies.

In the previously-noted methods for controlling, the actuator assemblies may include rotary actuators, specifically geared rotary actuators, with each of the actuators including a compound planetary gear set, wherein a central internal ring gear, having laterally-spaced first edge engagement members, is operatively interconnected, in one operating position, to an output member attached to the movable surface, via laterally-spaced and laterally movable opposed lock plates, the lock plates having laterally-spaced second edge engagement members and radially-extending pins, the second edge engagement members, in one operative position, being adapted to operatively interact with their respective first edge engagement members; an engagement/disengagement collar having a plurality of peripheral cam slots, with the pins entering the cam slots; a sector gear located on a peripheral portion of the collar, the sector gear being in operative engagement with the disconnect actuator, the latter, depending upon the direction of rotation, coupling/uncoupling the output member with the rotary geared actuator via rotation of the collar, which in turn results, via movement of the pins, in the lateral movement of the lock plates and in one of the engagement and disengagement of the first and second engagement members.

In the noted method for controlling the actuator assemblies may also include linear actuators, specifically linear actuators of the ball screw type, with each of the actuators including a bidirectionally rotatable power driven ball screw; a reciprocable ball nut having peripherally-spaced outward first surface engagement portions, driven by the ball screw, the ball nut being operatively interconnected in one operating position, to an output member attached to the movable surface, via laterally adjacent and oppositely rotationally movable front and rear locking plates, the locking plates having respective peripherally-spaced inward second surface engagement portions and respective radially extending sector gear portions, the second surface engagement portions, in one operative position, being adapted to operatively interact with the first surface engagement portions; the sector gear portions being in operative engagement with opposite sides of a face gear of the disconnect actuator, the latter, depending upon the direction of rotation, coupling/uncoupling the output member with the ball screw actuator via rotation of the sector gear portions, which in turn results, via movement of the sector gears, in the peripheral movement of the locking plates and in one of the engagement and disengagement of the first and second engagement portions.

In one of the methods for controlling of this invention, the control surface is one of a primary and secondary control surface of the aircraft.

In a further variation of this invention, in a vehicle, having a fixed supporting structure and a load movable relative thereto, a jam tolerant actuating system includes the following operatively interconnected components: a computer, an electronic decision-making controller and at least two actuator assemblies, each of the actuator assemblies further including a main mechanical power source for providing motion force therefore; a load sensor and a position sensor on the actuator assembly; a coupling/decoupling mechanism, positioned at the output member of the actuator assembly, for completing/severing the load path between the actuator assembly and the load; and a disconnect mechanical power source for providing motive force for the coupling/decoupling mechanism, a method of controlling the jam-tolerant actuating system, comprising the steps of: a. actuating the load via the actuator assembly as directed by the computer via Command and Power inputs through the controller; b. relaying, from the controller to the computer, at least three of the following inputs: i. speed of the main mechanical power source; ii. main mechanical power source load; iii. actuator assembly output load from the load sensor; and iv. actuator assembly output position, processed to determine speed, from the position sensor; and c. decoupling, via completely severing, the load path between the actuator assembly and the load, via driving the coupling/decoupling mechanism in one direction, upon the detection of a malfunction, as determined by the controller, based on multiples of the inputs from step b.

In a variation of the previous method, the method of controlling further includes the step of: reversing the previous decoupling step, at any time, thereby reestablishing the load path, between the actuator assembly and the load, by driving the coupling/decoupling mechanism in a direction opposite to the one direction. This variation can also include the steps of: measuring, via the load sensor, one of the load present and occurring at an output member of the actuator assembly; measuring the actuator assembly input load; and comparing the input and output loads to detect if one of a jam and other type of failure has occurred within one of the actuator assembly and the control system. In addition, in these methods of controlling, the comparing of input and output loads may be limited to the input and output loads of the same actuating assembly or used in conjunction with similar readings from additional, redundant actuator assemblies.

In the previous method of controlling the actuator assemblies are comprised of one of rotary actuators, preferably electromechanical geared rotary actuators, or of linear actuators, preferably of electromechanical ball screw-type actuators.

In another embodiment of this invention, in a vehicle having a fixed supporting structure and a load movable relative thereto, a jam tolerant actuating system includes the following operatively interconnected components: a computer; an electronic decision-making controller; and at least two rotary geared actuator assemblies, each of the actuator assemblies further including a main mechanical power source for providing motion force therefore; a load sensor and a position sensor on the actuator assembly; a coupling/uncoupling mechanism, positioned at the output member of the actuator assembly, for completing/severing the load path between the actuator assembly and the load; and a disconnect mechanical power source for providing motive force for the coupling/decoupling mechanism, the rotary geared actuator assembly further including: a compound planetary gear set, wherein a central ring gear, having opposing, laterally-spaced, first edge engagement members, is operatively interconnected, in one operating position, to the output member attached to the movable load; via laterally-spaced and laterally movable opposed lock plates, the lock plates having laterally-spaced second edge engagement members and radially extending pins, the second edge engagement members, in one operative position, being adapted to operatively interact with respective adjacent ones of the first engagement members; an engagement/disengagement collar having a plurality of peripherally extending cam slots, with the pins entering the cam slots; and a sector gear located on a peripheral portion of the collar, the sector gear being in operative engagement with the disconnect mechanical power source, the latter, depending upon the direction of movement, coupling/uncoupling the output member with the rotary geared actuator assembly via rotation of the collar, which in turn, via movement of the pins, in the lateral movement of the lock plates and in one of the engagement and disengagement of the first and second engagement members.

In the jam tolerant actuating system of the preceding embodiment, a process of controlling the system, includes the following steps: a. actuating the load via the actuator assembly as directed by the decision making controller via Command and Power inputs from and Status inputs to the computer; b. relaying, from the controller to the computer, at least three of the following inputs: i. speed of the main mechanical power source; ii. main mechanical power source load; iii. actuator assembly output load from the load sensor; and iv. actuator assembly output position, processed to determine speed, from the position sensor; and c. decoupling, via completely severing, the load path between the actuator assembly and the load, as determined by the controller, based on the inputs of step b. This process of controlling may further include the step of d. reversing, at any time, the previous decoupling of step c, thereby reestablishing the load path, between the actuator assembly and the load, by driving the coupling/uncoupling mechanism in a direction opposite to the one direction.

In a further embodiment of this invention, in a vehicle, having a fixed supporting structure and a load movable relative thereto, a jam-tolerant actuating system includes the following operatively interconnected components: a computer; an electronic decision-making controller and at least two linear actuator assemblies, each of the actuator assemblies further including a main mechanical power source for providing motion force therefore; a load sensor and a position sensor on the actuator assembly; a coupling/decoupling mechanism, positioned at the output member of the actuator assembly, for completing/severing the load path between the actuator assembly and the load; and a disconnect mechanical power source for providing motive force for the coupling/decoupling mechanism, the linear actuating assembly further including: a. a bidirectionally rotatable power driven ball screw; b. a reciprocable ball nut, actuated via the ball screw, having peripherally-spaced outward first surface engagement portions, the ball nut being operatively interconnected in one operative position, to the output member attached to the movable load, via c. laterally adjacent and oppositely rotationally movable front and rear locking plates, the locking plates having respective peripherally-spaced inward second surface engagement portions and respective radially extending sector gear portions, the second surface engagement portions, in one operative position, being adapted to operatively interact with the first surface engagement portions, the sector gear portions being in operative engagement with d. opposite sides of a face gear of the disconnect mechanical power source, the latter, depending upon the direction of movement, coupling/uncoupling the output member with the linear actuating assembly via opposite rotation of the sector gear portions, which in turn, results, via movement of the sector gears, in the peripheral movement of the locking plates and in one of the engagement and disengagement of the first and second engagement portions.

In the jam tolerant actuating system of this embodiment, a process of controlling the system includes the following steps: a. actuating the load via the linear actuator assembly as directed by the decision making controller via Command and Power inputs from and Status inputs to the computer; b. relaying, from the controller to the computer, at least three of the following inputs: i. speed of the main mechanical power source; ii. main mechanical power source load; iii. actuator assembly output load from the load sensor; and iv. actuator assembly output position, processed to determine speed, from the position sensor; and c. decoupling, via completely severing, the load path between the actuator assembly and the load, via driving the coupling/uncoupling mechanism in one direction, upon the detection of a malfunction, as determined by the controller, based on the inputs from step b. This process of controlling preferably includes the steps of: measuring, via the load sensor, the load present at the output member; measuring the actuator assembly input load; and comparing the input and output loads to detect if a jam has occurred.

BRIEF DESCRIPTION OF THE DRAWINGS

FIG. 11 is a view, similar to that of FIG. 1, with parts removed, showing the actuator in the disengaged position.

FIG. 12 is an enlargement of circled area 12 of FIG. 11, showing details of the disengagement.

FIG. 13 is a view, similar to that of FIG. 9, but showing the actuator in an engaged position.

FIG. 14 is a view, similar to that of FIG. 10, but showing the actuator in an engaged position.

FIG. 15 is a view, similar to that of FIG. 11, but showing the actuator in the engaged position.

FIG. 16 is an enlargement of circled area 16 of FIG. 15, showing details of the engaged position.

FIG. 19 is a perspective schematic view of a portion of a second embodiment of the electromechanical actuators according to the present invention.

FIG. 20 is a view, similar to that of FIG. 19, without the mode motor and gearbox of the latter.

FIG. 21a is an enlarged perspective schematic view of the unique ball nut and the ball screw that are utilized in FIGS. 19 and 20.

FIG. 21b is a view, similar to that of FIG. 21a including one of the two locking plates associated therewith.

FIG. 22 is a view, similar to that of FIG. 21b including both of the locking plates.

FIG. 23 is a view, similar to that of FIG. 22 including the several thrust bearings associated with the locking plates.

FIG. 24b is a view, similar to that of FIG. 24a, but shown in a coupled position.

FIG. 25a is an end view, of the mode motor and gear box end of FIG. 24a.

FIG. 25b is an end view, of the mode motor and gear box end of FIG. 24b.

FIG. 26a is a longitudinal side view of the actuator of FIG. 24a.

FIG. 26b is a longitudinal side view of the actuator of FIG. 24b.

FIG. 27a is an enlarged longitudinal sectional view, taken along line 27a-27a of FIG. 24a.

FIG. 28a is a lateral sectional view, taken along line 28a-28a of FIG. 27a.

FIG. 28b is a lateral sectional view, taken along line 28b-28b of FIG. 27b.

FIG. 29a is a further lateral sectional view, taken along line 29a-29a of FIG. 28a.

FIG. 29b is a further lateral sectional view, taken along line 29b-29b of FIG. 28b.

DETAILED DESCRIPTION OF THE INVENTION

Figure 1:
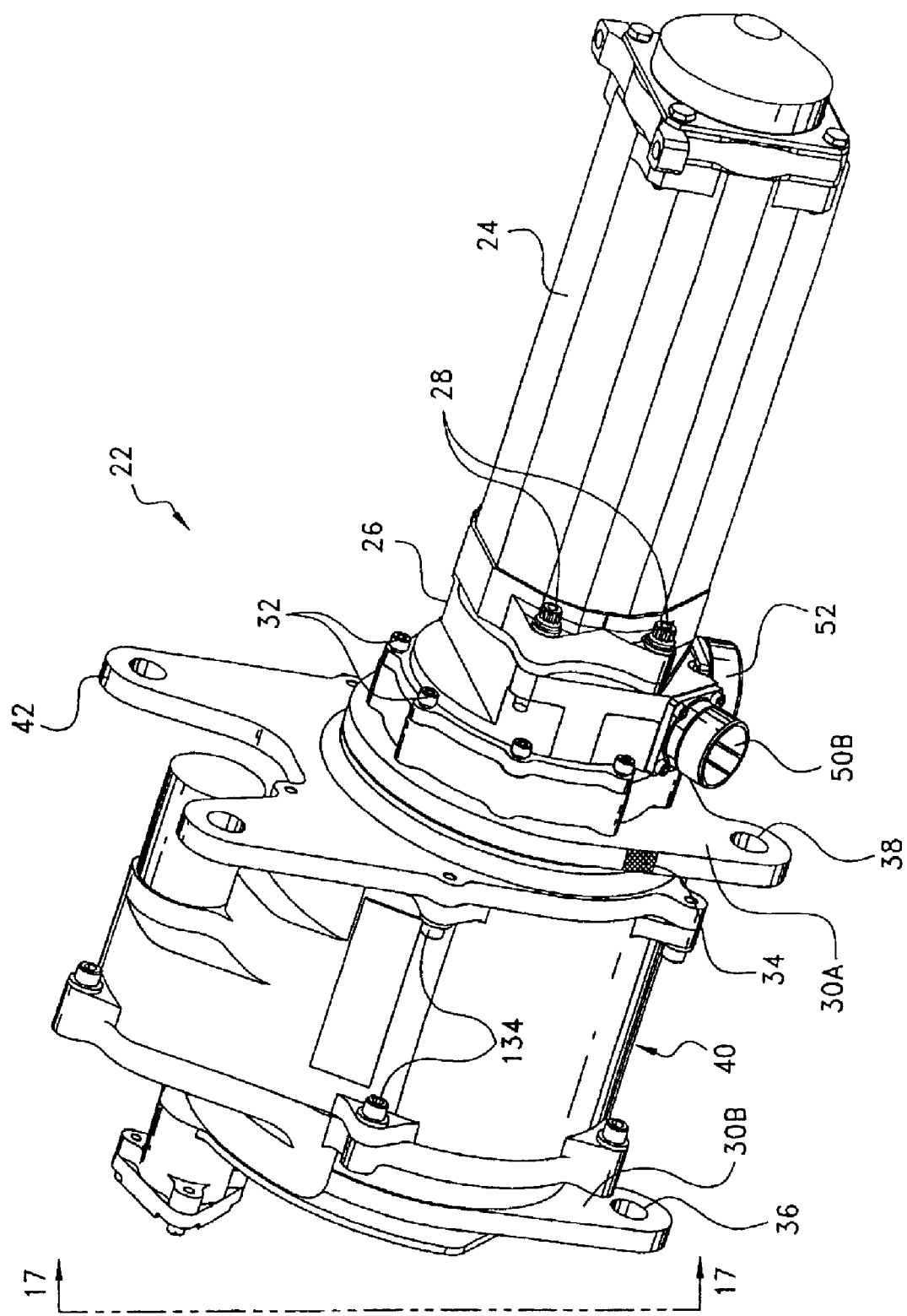
FIG. 1 is a perspective view of a first embodiment of the electromechanical actuators according to the present invention.
Figure 18:
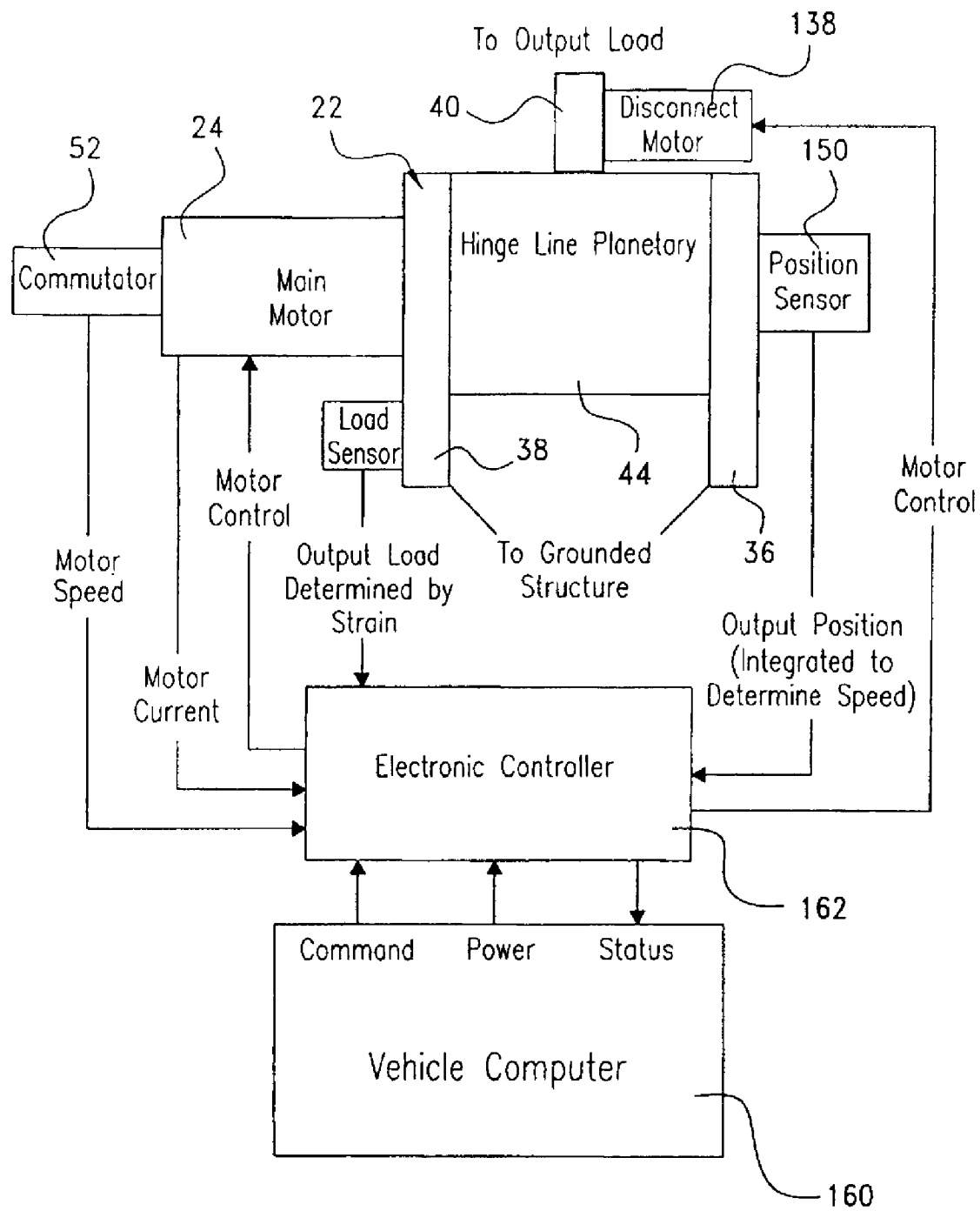
FIG. 18 is a schematic illustration of a first jam tolerant electromechanical actuation system that utilizes the actuator of FIG. 1.
Figure 25A:
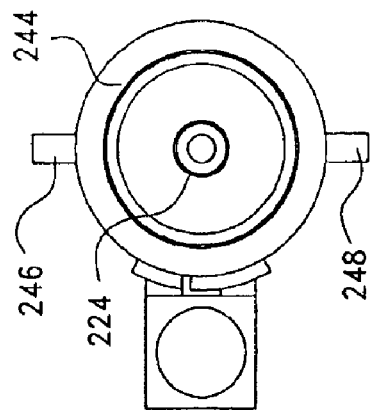
Figure 24A:
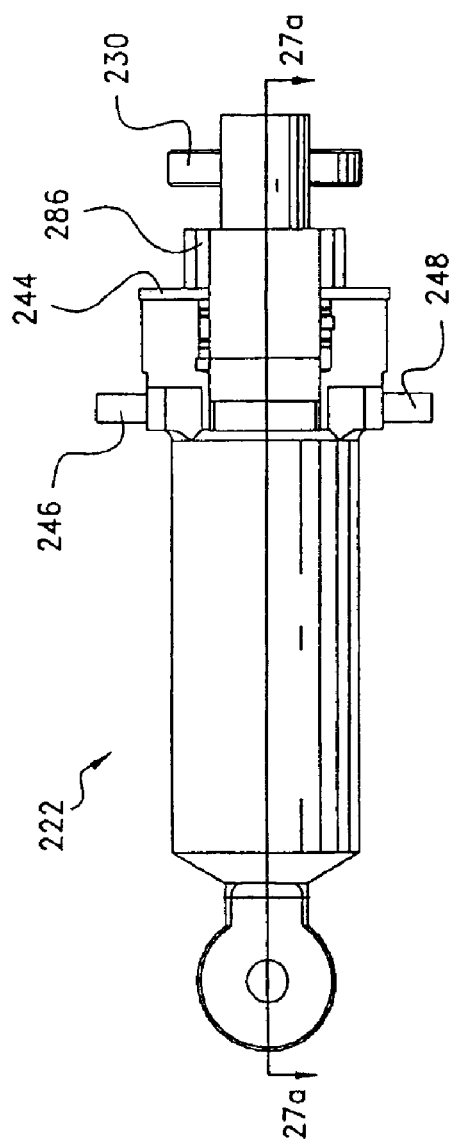
FIG. 24a is a schematic bottom view of the actuator of FIG. 19, shown in an uncoupled position.
Figure 26A:
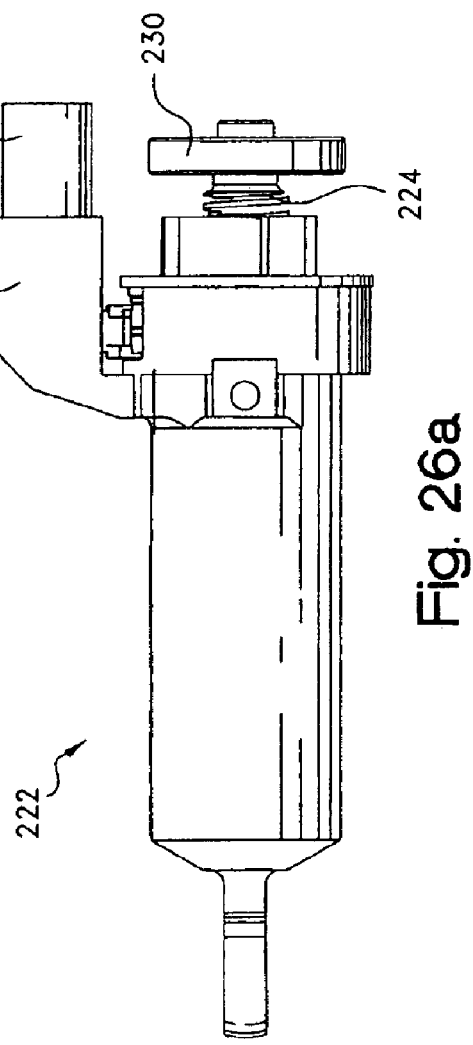
Figure 27A:
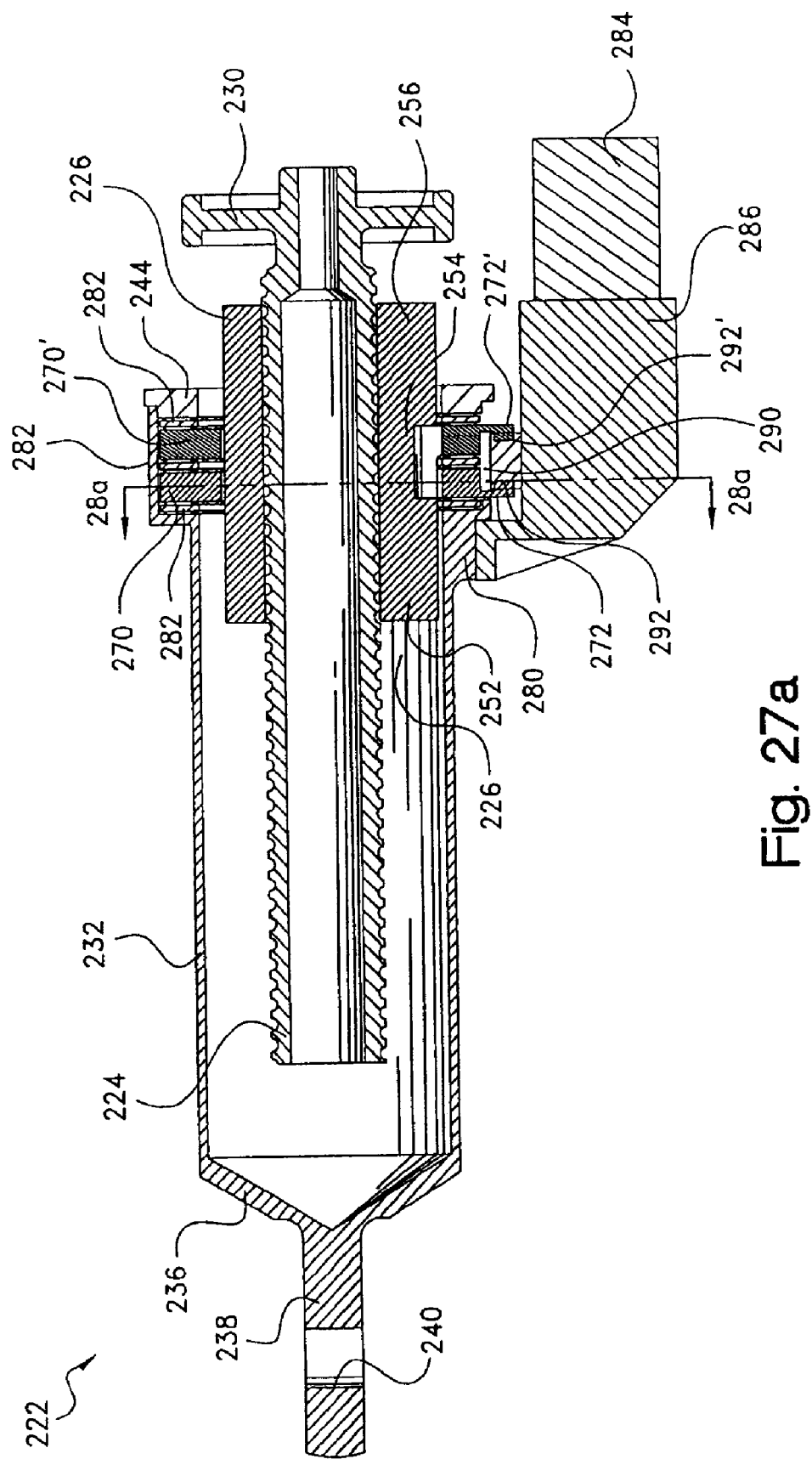
Figure 27B:
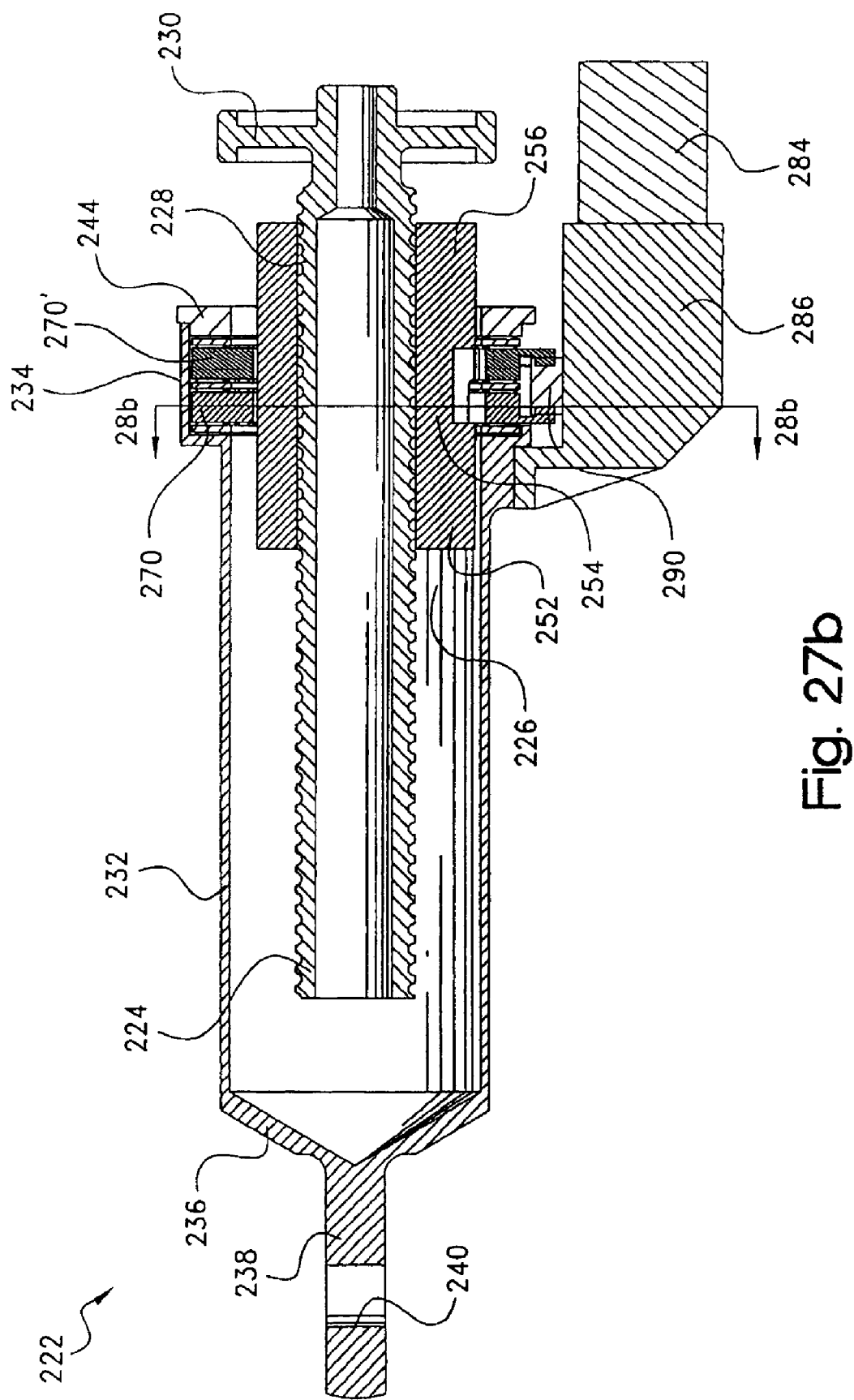
FIG. 27b is an enlarged longitudinal sectional view, taken along line 27b-27b of FIG. 24b.
Figure 29A:
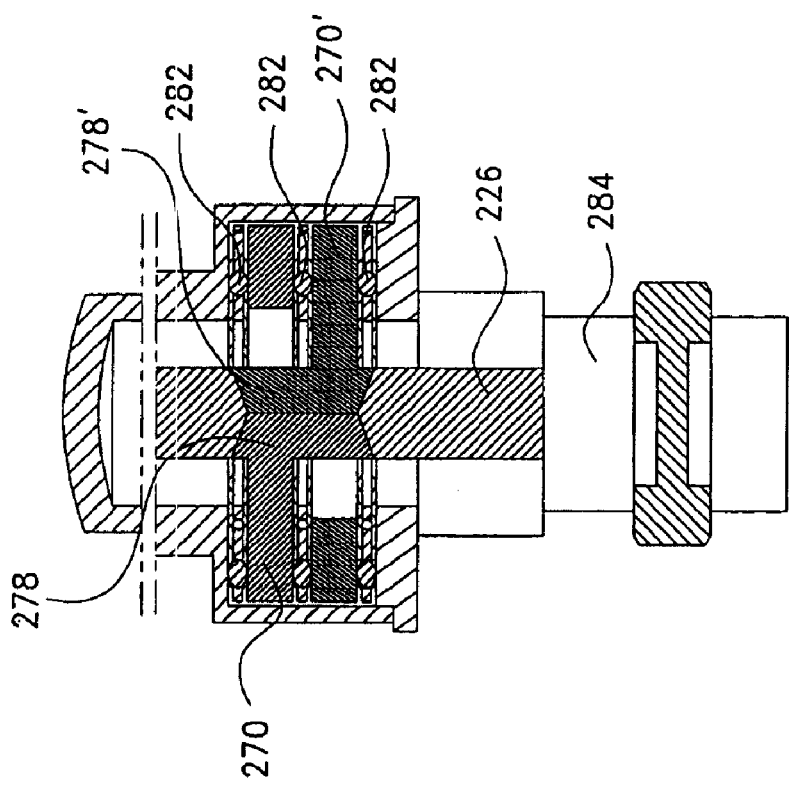
Figure 28A:
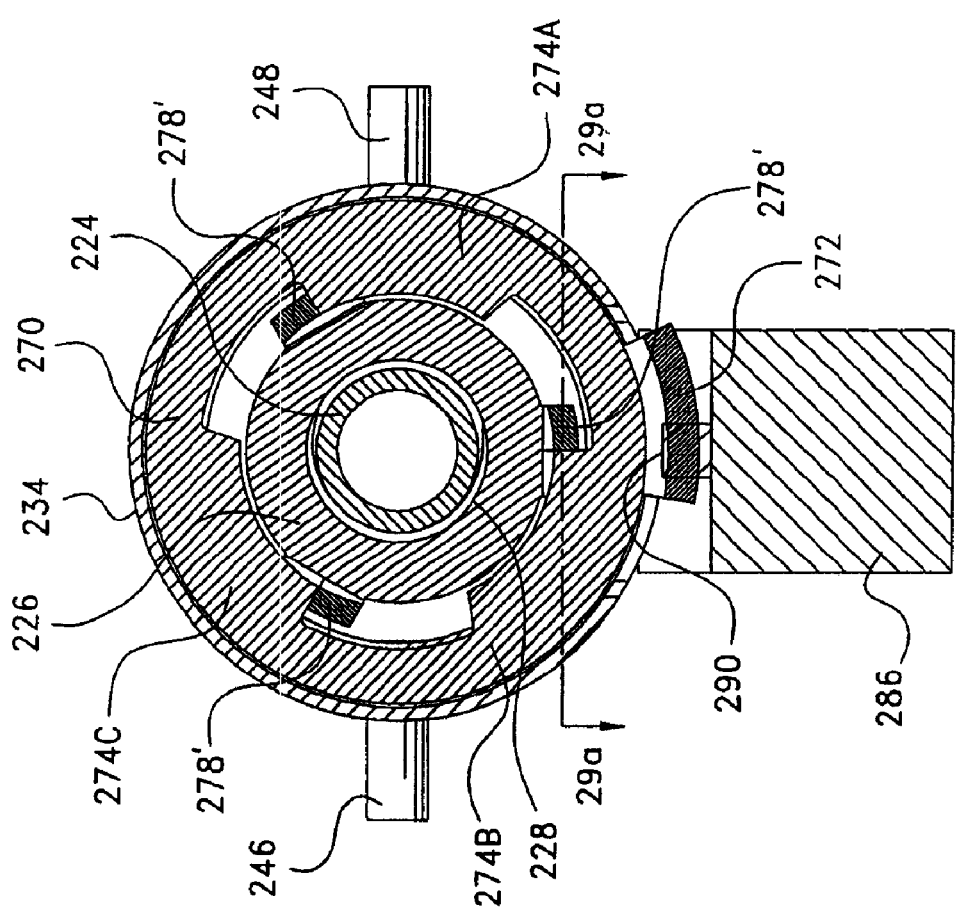

Referring now to the drawings wherein like numerals are used throughout the several views to designate like parts, and more particularly to FIGS. 1, 2, 3 and 18, illustrated therein is an electromechanical geared rotary actuator (GRA), generally designated by reference numeral 22, suitable for use, for example, in single and/or multiple jam-resistant electromechanical actuating systems, such as single unit actuator system 20, shown in FIG. 18. GRA 22, which is utilized, for example, for primary or secondary flight surface control, includes, as best seen in FIGS. 1 and 18, an input power source, such as a bidirectionally rotatable prime mover or mechanical power source, such as electric motor 24, the proximate end of which is fixedly secured, via a plurality of bolts 28, to a connector housing 26, which in turn is connected, via a plurality of further bolts 32, to grounded housing structures 30a, 30b, that include axially-spaced, separate, front and rear end flange portions 36 and 38, respectively, all of which will be described in more detail hereinafter. Again as best illustrated in FIGS. 1 and 18, an edge surface of flange portion 38 is provided with an affixed load sensor 34, preferably in the form of a strain gauge of any desirable commercially available type.

Located intermediate stationary flange portions 36, 38 is a rotatable or pivotable output structure 40 which functions to provide a mechanical connection to the load, i.e., the surface that needs to be controlled, with output structure 40 including an output flange portion 42, all of which will again be described in more detail hereinafter. The front end of GRA 22, extending axially beyond front end flange portion 36, is closed via a front hinge cover 46 that is secured to flange portion 36 via a plurality of bolts 48. As best seen in FIG. 1, a commercially available reversible or bidirectional rotary electric motor 24, which for the sake of electrical redundancy is shown here, for example, as a tandem dual motor assembly, includes dual circumferentially-spaced receptacles 50a, 50b (FIG. 2), located on the periphery of connector housing 26, that function for electrical connections to the dual motor windings, respectively, while a further receptacle 52, intermediate receptacles 50a, 50b, functions for electrical connections for the dual motor resolvers and commutators for logic/motor position control and/or sensing in a manner well known in the art.

Figure 4:
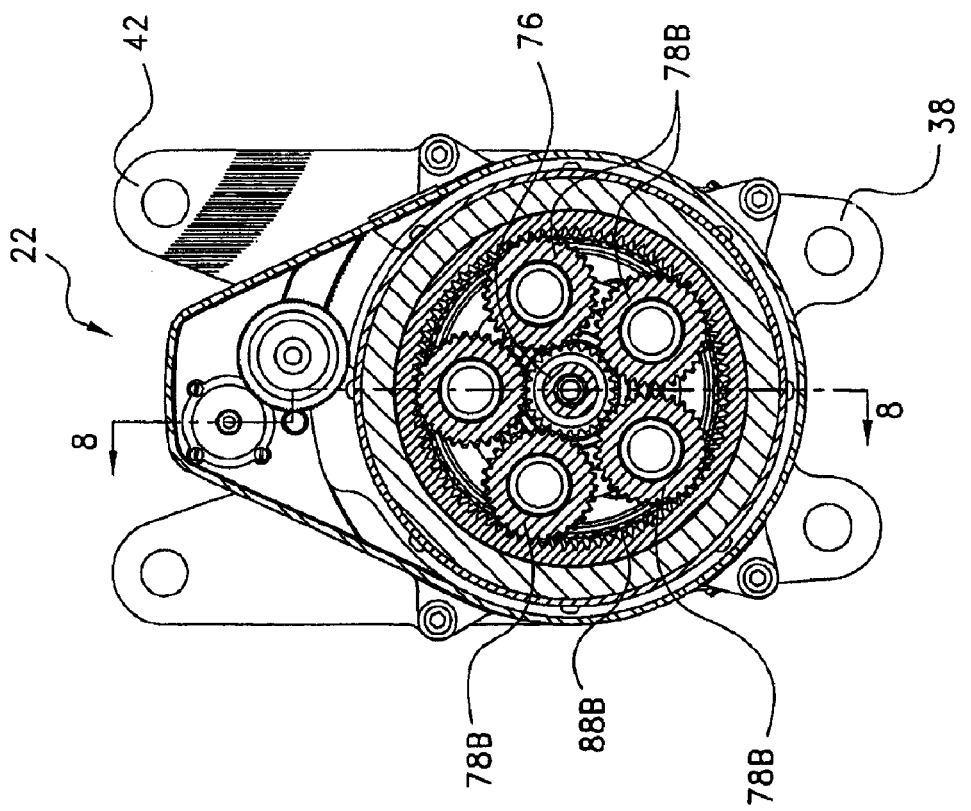
FIG. 4 is a sectional view, taken along line 4-4 of FIG. 3.
Figure 5:
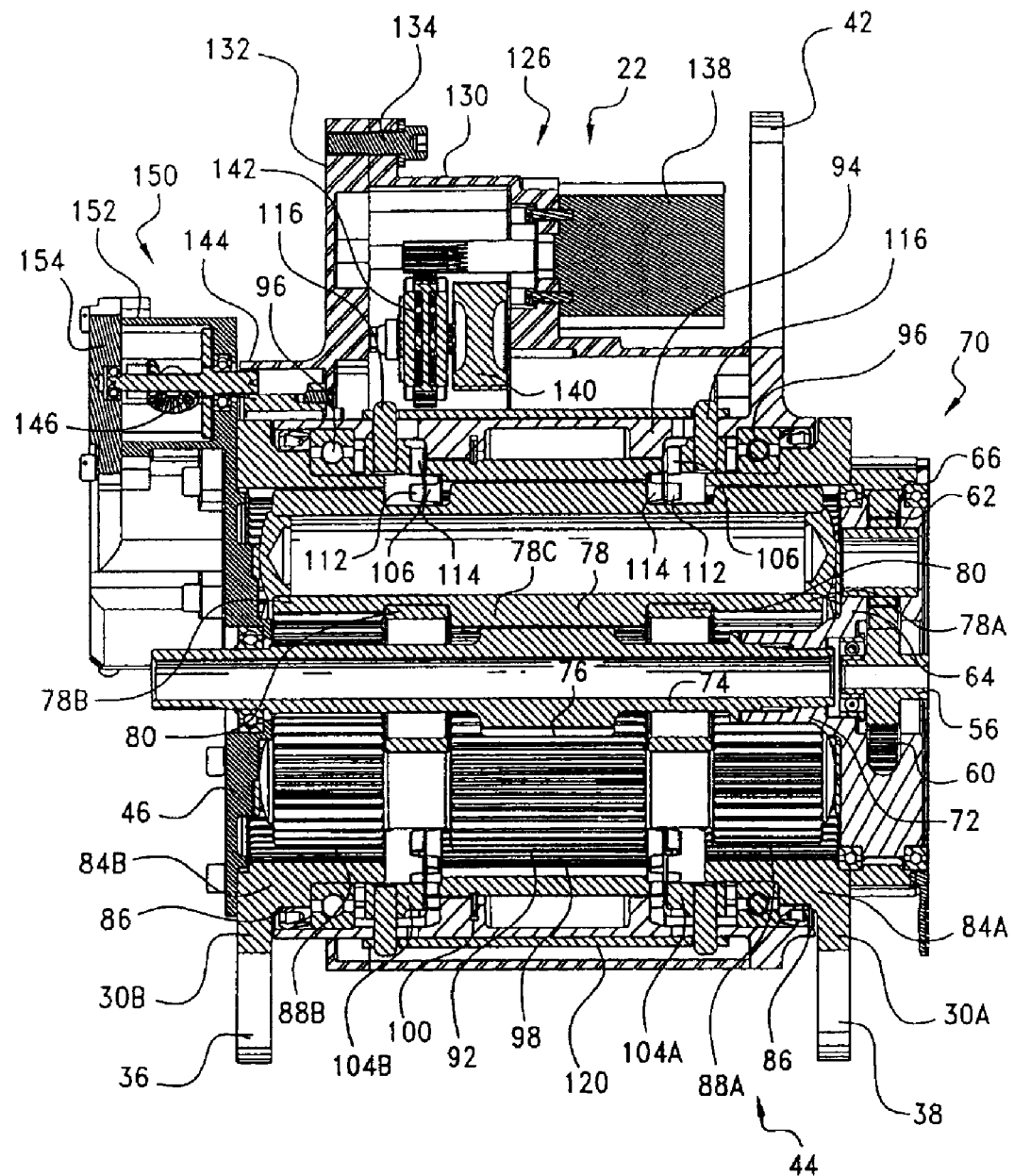
FIG. 5 is an enlarged longitudinal sectional view, taken along line 5-5 of FIG. 2.

Turning now additionally to FIGS. 4 and 5, which are transverse and longitudinal sectional views, respectively of GRA 22, rotational power from motor 24 is coupled (not shown per se) to an intermediate shaft 56, which has a sun gear 60, fixedly attached to the distal end thereof, with sun gear 60 functioning as an input member. Sun gear 60, in turn, is in meshed relationship with at least one planet gear 62 which also meshes with and reacts against a fixed internal ring gear 66 that is affixed to an end face of grounded housing structure 30a. A rotatable planet carrier 64 thus acts as the output member. This combination of intermeshing gears 60, 62, 66 and planet carrier 64, together comprise a supplementary or optional gearing speed reducer structure 70 that may or may not be required, depending upon the type and severity of service or moving force required of GRA 22.

A central hub portion 72 of output planet carrier 64 is splined to the proximate end of a central, longitudinally-extending, preferably hollow input shaft 74, journalled in carrier 64 on its proximate end, may or may not extend completely through GRA 22 and is journalled, in this embodiment, on its distal end, in front hinge cover 46. Input shaft 74, at its about longitudinal center portion, includes a preferably integral hinge sun gear 76, forming a part of a hinge assembly planetary gear train 44, which meshes with the center portions or segments of a plurality of preferably hollow hinge planet gears 78 that include integral, axially-spaced, planet outer portions 78a, 78b, and planet center portions 78c. Planet outer portions 78a, 78b, are longitudinally as well as radially spaced and separated about hinge sun gear 76 via longitudinally separated ring spacers 80.

Figure 8:
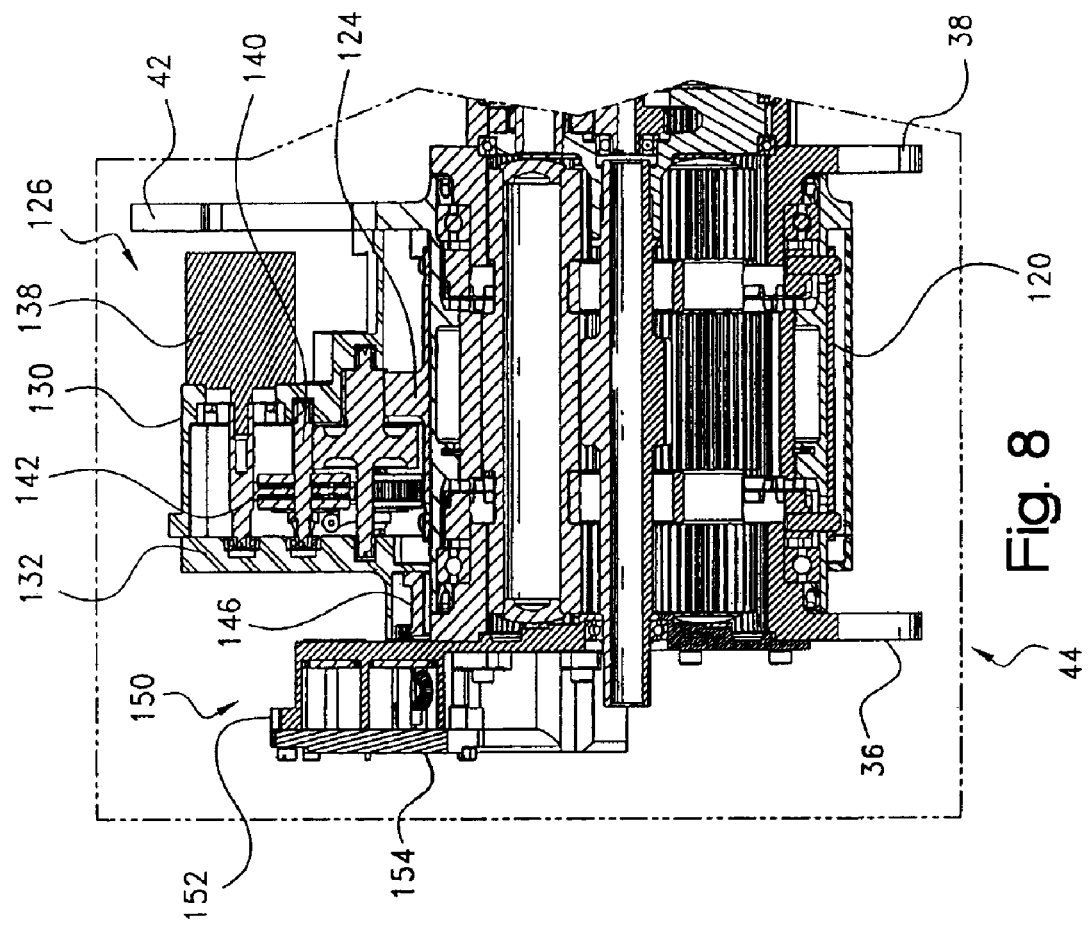
FIG. 8 is a sectional view, partially broken away, taken along line 8-8 of FIG. 4.
Figure 7:
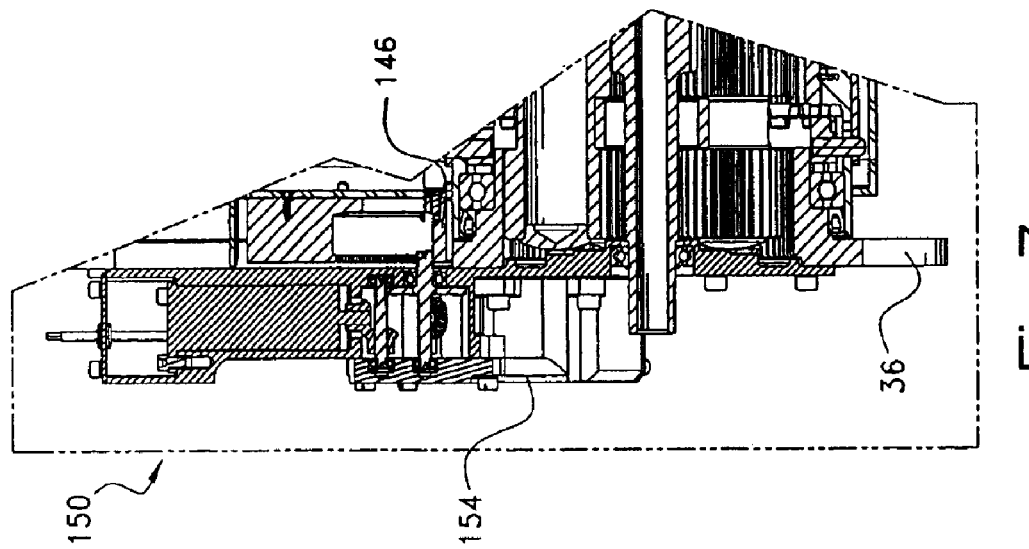
FIG. 7 is a sectional view, partially broken away, taken along line 7-7 of FIG. 6.

Grounded housing structures 30a, 30b, in addition to their separate flange portions 36, 38, also include respective cylindrical portions 84a, 84b, each having stepped peripheral surfaces 86 as well as respective fixed, peripheral outer ring gear portions 88a, 88b that are also in respective meshing relationship with hinge planet gear portions 78a, 78b. Thus, it should be understood that hinge planet gear portions 78a, 78b, revolve around hinge sun gear 76, with peripheral outer ring gear portions 88a, 88b, serving as reaction members. Portions of this gear train are also illustrated in FIG. 8 and particularly in FIG. 17.

The center portions 78c of planet hinge gear 78, in addition to meshing with sun gear 76, also mesh with a rotatable, central internal ring gear 92, axially interposed between, but spaced from fixed ring gear portions 88a, 88b. It is the differential ratio between the outer internal ring gears 88a, 88b,/ outer planet gear portions 78a, 78b, and the center ring gear portion 92/center hinge planet gear portions 78c, that produce the motion of central internal ring gear 92 relative to the outer internal ring gear portions 88a, 88b. It should be understood that the previously-described hinge motion, achieved via planetary gear train 44, could also be achieved via other forms of power transmissions well known in the art.

Continuing with the FIGS. 4 and 5 descriptions, a cylindrically-extending portion 94 of output flange portion 42 of pivotable output structure 40, is rotatably journalled, via axially-spaced rolling element bearings 96 retained on spaced stepped peripheral surfaces 86 of housing structures 30a, 30b. Thus, it should be understood that cylindrical portion 94, connected to the load, together with output flange portion 42, can rotate or pivot relative to grounded housing structures 30a, 30b. In order to minimize any axial movement of cylindrical portion 94, relative to the radial outer surface 98 of central internal ring gear 92, while still permitting rotary movement thereof, the former is linked relative to the latter via an internal lock ring 100.

Figure 17:
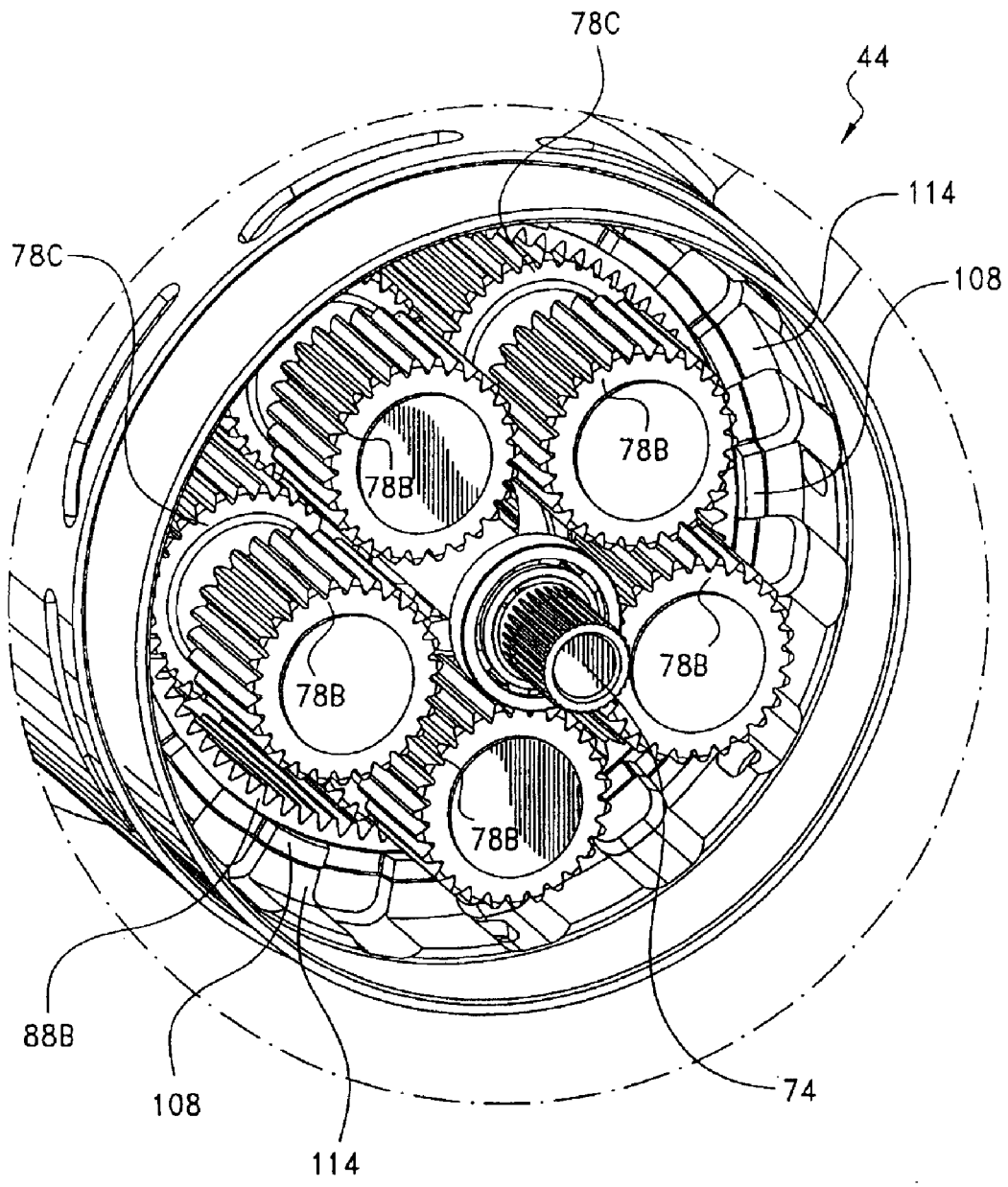
FIG. 17 is an enlarged view, with parts removed for the sake of clarity, looking in the direction of arrows 17-17 of FIG. 1, showing the major rotating parts of the compound planetary gearing of this actuator.

Turning now additionally to FIGS. 11, 12, 15 and 16, also slidably located on opposed, stepped peripheral housing surfaces 86 are oppositely-directed, generally annular, lock plates 104a, 104b, each having a plurality of laterally inwardly-extending tooth portions 106 that are capable of meshing with corresponding lateral tooth portions 108 extending from opposed ends of the surface 110 of the body of internal ring gear 92 of actuator 22. Lock plates 104a, 104b, serve to couple and uncouple element portions 94 and 110. The interaction of tooth portions 106-108 is best shown, in this disengaged position in FIGS. 11 and 12, and in their engaged position in FIGS. 5, 15 and 16. As best seen in FIG. 17, output cylindrical portion 94 is also provided with opposed laterally extending tooth members 114 which are designed to correspond with tooth members 106 and 108. In summary, power is transferred from internal ring gear 92, through opposed teeth 108, to the mating teeth 106 on the radially innermost portions of lock plates 104a, 104b, then through the radially outermost portions of lock plate teeth 106, and finally into tooth members 114 on output member 94.

Figure 2:
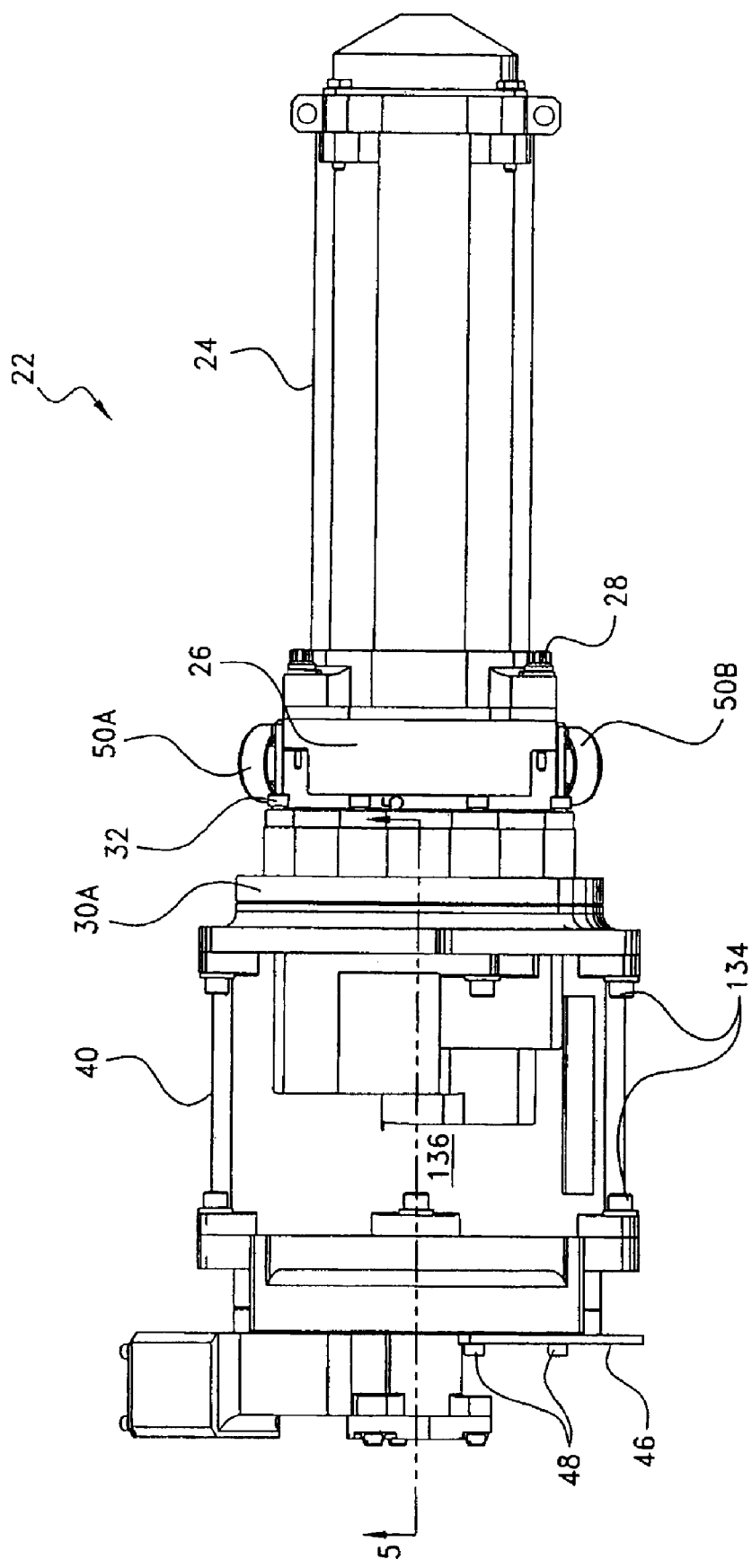
FIG. 2 is a top plan view of the actuator of FIG. 1.
Figure 3:
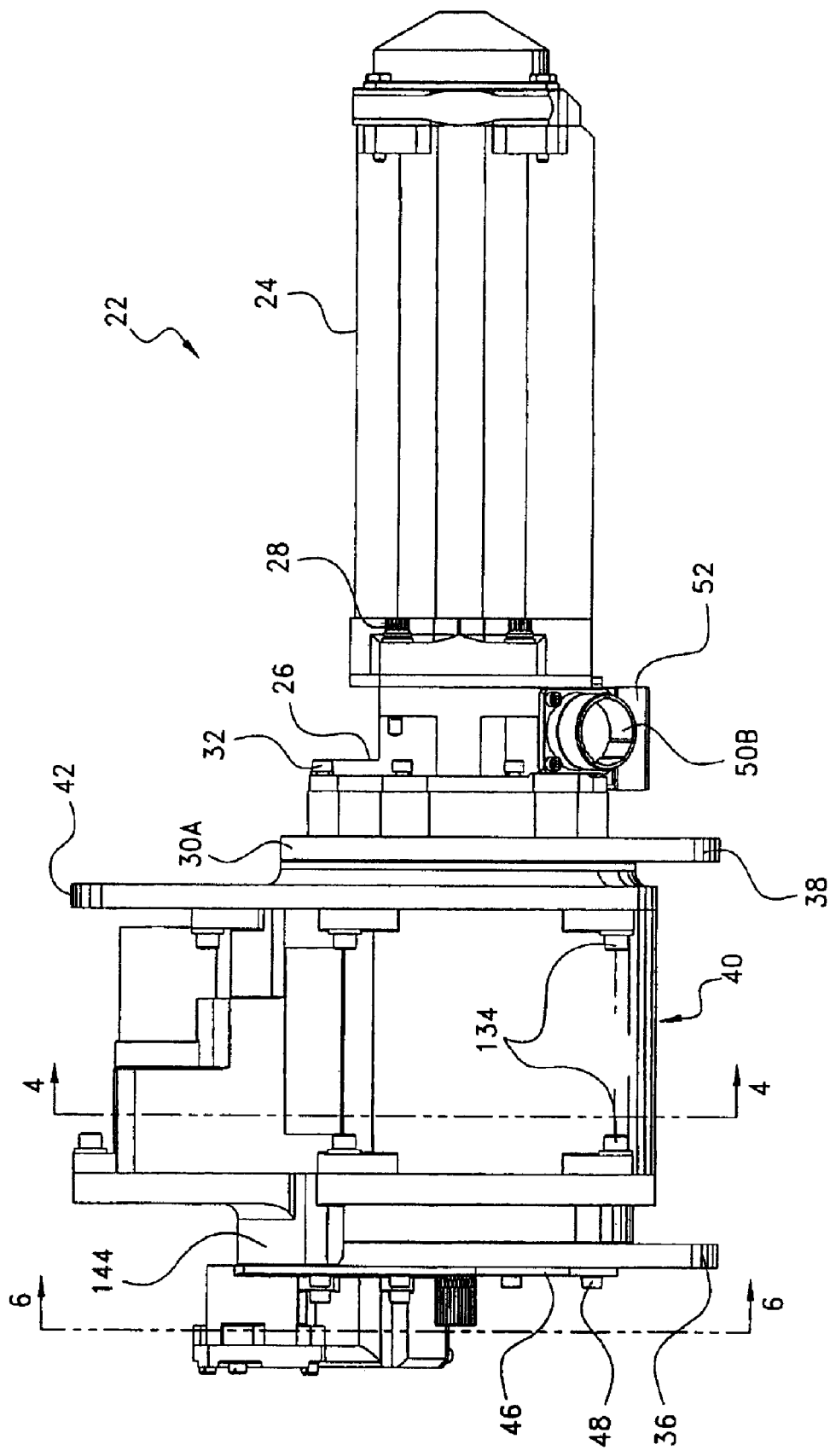
FIG. 3 is a side plan view of the actuator of FIG. 1.
Figure 6:
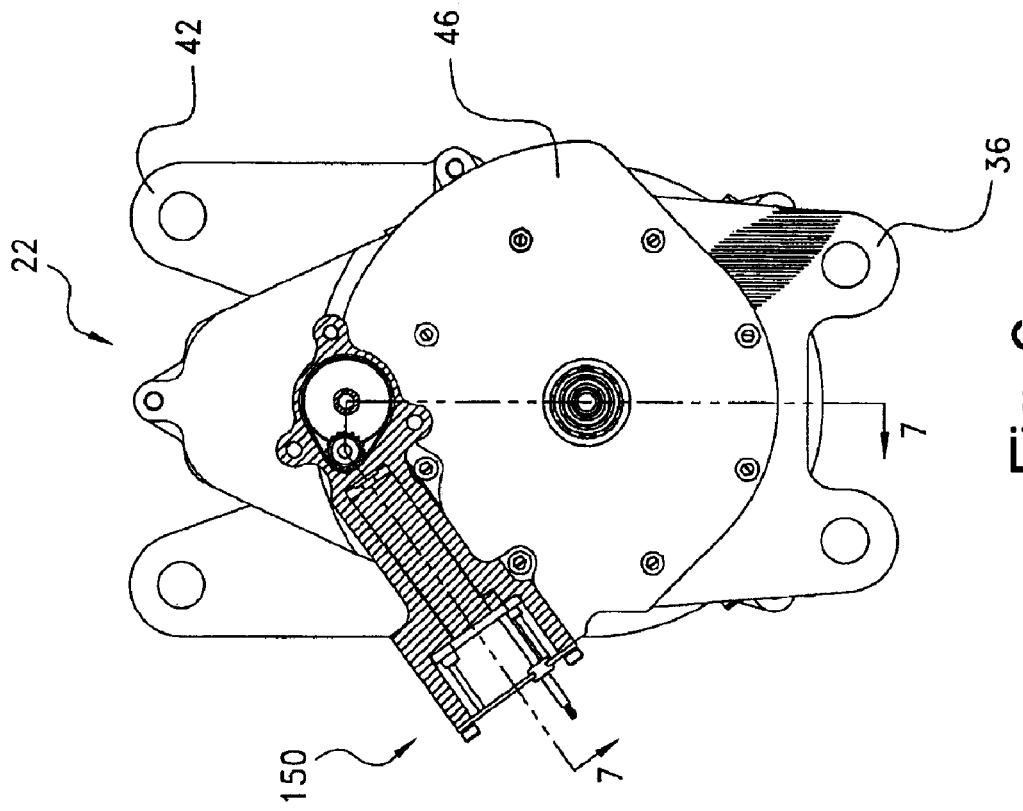
FIG. 6 is an end view, partially in section, of the RVDT-end of the actuator of FIG. 3 looking in the direction of arrows 6-6 of FIG. 3.
Figure 9:
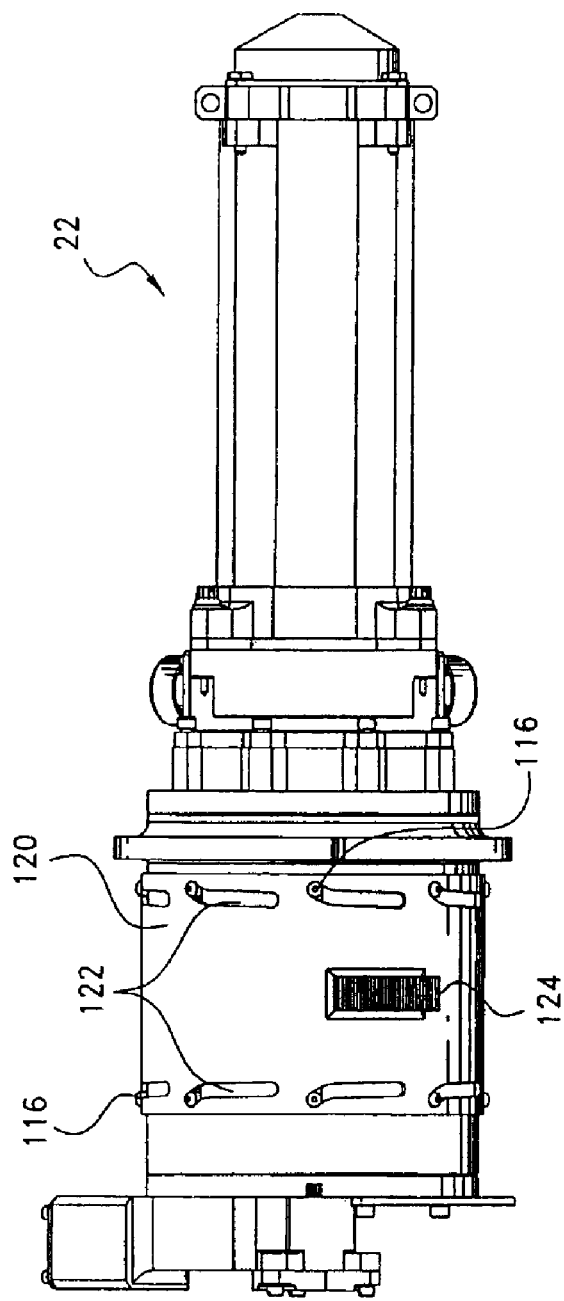
FIG. 9 is a view, similar to that of FIG. 2, with parts removed, showing the actuator in a disengaged position.
Figure 10:
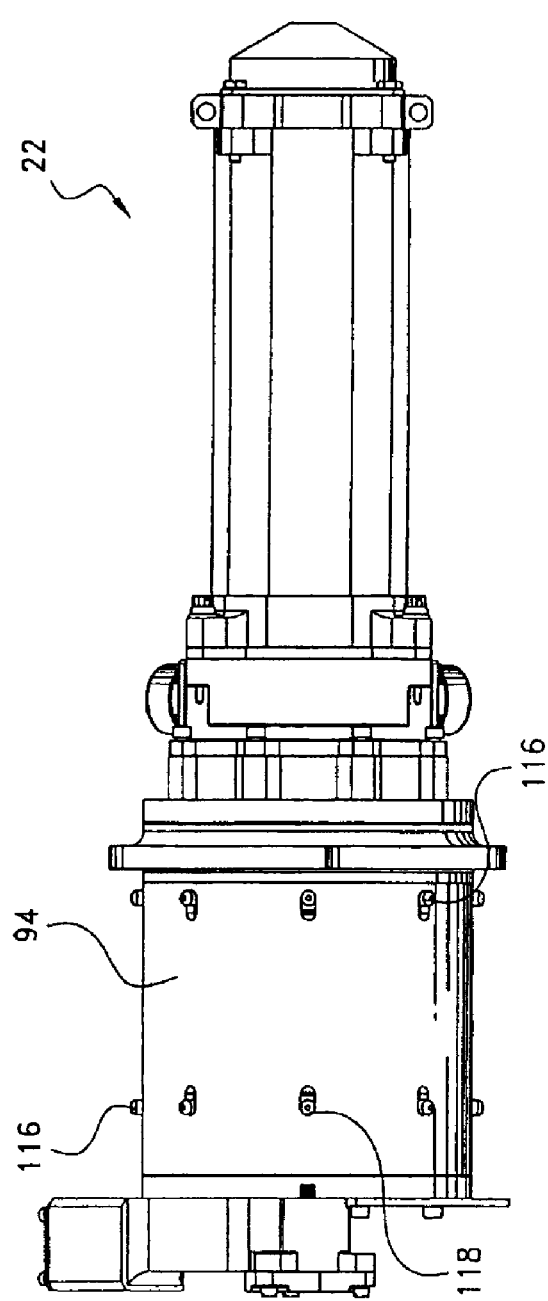
FIG. 10 is a view, similar to that of FIG. 9, with further parts removed.

Lock plates 104a, 104b, are further provided with pluralities of circumferentially-spaced, laterally outwardly-directed dowel pins 116, each of which extends fully through laterally elongated apertures 118 (FIGS. 10, 11) in output cylindrical portion 94 as well as at least extending into an individual skewed slot 122 (FIGS. 9, 14) in a peripheral, cylindrical, lock collar 120 extending around, and rotatably moveable, relative to, the outer peripheral surface of output portion 94. A peripheral portion of lock collar 120 is provided with a sector gear 124 (FIGS. 8, 9, and 13) of limited circumferential extent, preferably in the range of 15 to 45 degrees. As will be explained in detail later, sector gear 124 is adapted to be engaged with and reversibly driven by a spur gear train assembly 126 (FIGS. 5, 8), thereby rotating lock collar 120 relative to output portion 94. Lock collar 120 is enclosed within a further multi-shape peripheral outer housing 130 whose inner axial end portion abuts output flange portion 42 and its outer axial end portion abuts at an intermediate cover 132, interposed between outer housing 130 and front hinge cover 46. As best seen in FIGS. 1-3, outer housing 130 is secured, on one axial end, to output flange portion 42 and, on its other axial end, to intermediate cover 132 via a plurality of bolts 134. It should be understood at this time, particularly with reference to FIGS. 1 and 2, that pivotable output structure 40, including outer housing 130, intermediate cover 132 and flange portion 42, can move peripherally relative to grounded housing structures 30a, 30b, including their respective flange portions 38, 36. This is graphically illustrated in FIG. 2 wherein the sections G1 and G2 that remain stationary to ground are shown confined within broken lines, while the section R that rotates with the load, around rotational axis 136, is shown confined within the dotted lines.

As possibly best seen in FIGS. 5 and 8, located within a cavity defined by outer housing 130 and intermediate cover 132, is spur gear train assembly 126, of a decoupling mechanism 128, which can be reversibly rotated by an external driving source or actuator, such as electric connect/disconnect motor 138. The exact structural details of the gear reduction sequence of gear train assembly 126 are not critical and are readily deducible by one of ordinary skill in the art. What is important is that a cluster gear 140 meshes with and drives sector gear 124 of cylindrical lock collar 120, and that a torque limiting clutch 142, of any desired conventional construction, functions to prevent possible overload damage to gear train assembly 126. It should, of course, be clear to those skilled in the art, that other embodiments of jam tolerance mechanisms may not require or need the use of a torque limiting clutch, such as 142.

Turning now to FIGS. 3, 5, 7 and 8, intermediate cover 132 includes a curved sector housing portion 144 that extends sectorially (not shown per se) for a predetermined angular range (of about 45 to 120 degrees, for example) around but not in contact with, a portion of grounded housing structure portion 30b and contains therein a curved sector gear 146 of about the same angular extent. Sector gear 146 operatively interacts with a gear portion of a commercially available rotary variable differential transformer (RVDT) 150 that is located within a housing portion 152 of front hinge cover 46 and closed via its own cover 154. It is the function of RVDT 150 to serve as a position sensor, specifically of rotational angles, in a manner well known in the art, for determining the angular location or position of pivotable output structure 40, relative to grounded housing structure 30b, for control purposes to be described in detail, later. As is well known in the art, RVDTs utilize rotary ferromagnetic cores and are capable of continuous rotational measurement. Again, the exact structural details of RVDT 150 are not critical and are easily deducible by one of ordinary skill in the art. What is important is the determination of the angular location of the pivotable output structure relative to the grounded housing structure, which in addition to using an RVDT, could also be accomplished by other position sensors such as, e.g., potentiometers, resolvers and syncros. In addition, such a position sensor could also be incorporated into the overall system, without being physically attached to the actuator, i.e., it could be mounted directly between the vehicle structure and the surface or item it senses as a separate physical unit that is electrically connected to the system.

Turning now to the operation of GRA 22, FIGS. 1, 5 and 15, 16 illustrate same in the normal operation thereof, i.e., when pivotable output structure 40 is mechanically coupled to grounded housing structure 30a, 30b, via the previously-noted intermeshing of tooth portions 106-108 and 114. Thus, in the coupled or engaged stage/state, main motor 24, affixed to grounded housing portions 30a, 30b, acting through optional gearing speed reducer 70, if required, and planetary gear train 44, transfers the motor rotary motion or torque to pivotable/rotatable output flange portion 42 which in turn is mechanically interconnected (not shown) to the load, i.e., the previously-noted movable surface that is controlled therewith. It is important to understand, at this time, that this invention contemplates that each such movable surface, for the sake of redundancy, is controlled via independent multiples of GRAs 22.

During such normal operational phases, bidirectional main motor 24 operates to pivot the noted movable surfaces, as directed, as illustrated in FIG. 18, by a vehicle computer 160, acting via Command and Power inputs, through an electronic controller 162, which in turn controls the function of main motor 24 and, as will be discussed later, also controls the function of disconnect motor 138. A Status input relays required information from controller 162 back to vehicle computer 160, with controller 162 receiving at least some of the following inputs from GRA 22:

Main Motor Speed from commutator 52;
Main Motor Current from main motor 24;
GRA Output Load (preferably determined by strain) from load sensor 34; and
GRA Output Position (processed, such as by differentiation to determine speed) from position sensor (RVDT) 150.

Upon the detection of a malfunction, such as, for example of a jam or other failure, of GRA 22, as determined by electronic controller 162, based on one or more of the just noted GRA inputs, decoupling mechanism 128 serves to completely sever the load path between GRA 22 and the load. Specifically, decoupling mechanism 128 includes the previously-recited spur gear train assembly 126, driven by reversible/bidirectional disconnect motor 138, whose cluster gear 140 meshes with and drives sector gear 124 of cylindrical lock collar 120. Rotational movement of lock collar 120, in one direction, causes multiple dowel pins 116, extending radially outwardly from opposed lock plates 104a, 104b, and extending through laterally-elongated apertures 118, in cylindrical portion 94, as well as extending into the individual, skewed, peripheral slots 122 (in lock collar 120), to be axially displaced and thereby driving lock plates 104a, 104b, out of engagement with the opposed mating portions of cylindrical portion 94 and the mating side portions of central internal ring gear 92, resulting in the complete disengagement of the intermeshing of tooth portions 106-108 and 114. It is a first important feature of this invention that the above decoupling method or process can, of course, also be reversed, at any time, (by driving disconnect motor 138 in a reverse or connect direction) to thereby re-couple the load to GRA 22.

In addition, a second important feature of this invention is that GRA 22 is provided with sensing device or strain gage 34 to sense or measure, either directly or indirectly, the load present or occurring at output member or structure 42. The system control, as illustrated in FIG. 18, can then compare the input load (either by direct or indirect measurement, such as via main motor current, and the like) to the output load, as well as the input speed and the output speed (using position and/or velocity sensors at main motor 24 and the load). This comparison, either by itself or used in conjunction with readings from additional redundant GRA(s) can be used to detect if a jam or other type of failure has occurred within GRA 22 or its control.

The above-recited two features, namely the load and speed comparisons, allow system 20 to detect a jam or other failure and isolate same from the remainder of the system 20 by activating the decoupling mechanism in the failed GRA unit 22. When used in a multiple GRA configuration, a failed GRA 22 can be effectively removed from system 20 without detriment to the remaining operative or healthy GRAs. It should be understood that a single computer 160, together with a single controller 162, can be utilized to control and monitor multiple GRAs 22. This removal of a failed GRA 22 will permit continued overall system function with full rate capability and load capability, reduced by one GRA over the total number of GRAs being utilized. The system is designed to produce a certain amount of load at a certain speed. The load that the system produces is the sum of the loads from each GRA. Upon the failure of one GRA, the load that the system can produce is reduced, but the speed at which it can move the load is unaffected. In the event of a failure, if but a single GRA 20 is remaining in the system, the electronic controller 162, in conjunction with the vehicle computer 160, may instruct GRA 20 to transition the load to a fixed neutral location. It should be understood that when using these GRAs, a system can never employ but a single actuator since the ability to tolerate a jam depends on having another GRA, other than the jammed one, to carry on the required operations. It should also be clear that it is the decision of those in charge of the vehicle computers as to whether to continue operation when only a single operative actuator remains or whether to revert to a safe mode and hold the item being controlled at a fixed, safe position.

In addition to the previously noted failure detection and isolation capability of system 20, system 20 has an additional feature in that it is also able to monitor trends in the relationship between GRA input power and output power as a part of a prognostic health or operational monitoring regime. This additional feature thus imparts the ability to detect certain impending failures before they actually occur and provide an alert signal to service the about-to-be impaired GRA prior to complete failure. The development of equipment health monitoring algorithms is still underway and testing thereof will be required before there can be quantitative characterization of actuator degradation, but upon the completion of this development, the systems of this invention are deemed to be capable of providing all of the information necessary for these systems to detect imminent faults.

The approach, in the method or process of the present invention, namely of severing the mechanical link of a power transmission device, at the load, while utilizing a completely reversible method or process is unique. This allows the decoupling mechanism 128 to potentially be tested prior to each use to eliminate the possibility of latent failures. The ability of the method or process of the system of this invention to actively control the decoupling also allows for GRA unit 22 to be decoupled for reasons other than mechanical overload. If a failure in system 20, that causes GRA unit 22 to decouple is determined to originate outside of unit 22, unit 22 can be re-coupled an re-used without the need for removal, refurbishment, or maintenance.

The method/process of the present invention may best be described in the system's employment of the features or characteristics as follows: First, reversible disengagement, without human intervention, (testable on the vehicle) and the disengagement of GRA 22 from the load at or as close as is practicable to the output (closest to load). Second, actuator fault (any type of failure or degradation) is determined by monitoring, at a minimum, main motor speed, main motor load, and output load. It should be understood that "motor" is deemed to refer to any source of mechanical power, i.e., electric motor, hydraulic motor, hand crank, etc., with this monitoring then activating the electronically controlled disengagement of the power transmission device, at the load. Furthermore, the method/process of system 20 is intended to cover all embodiments involving electronically controlled reversible disengaging load paths for mechanical power actuation.

Turning now to FIGS. 19-30, illustrated therein is a portion of a second embodiment of the present invention, namely a linear actuator, generally designated by reference numeral 222. Parts thereof that are similar or analogous to those of the first embodiment or GRA 22 are identified with a double prime (") suffix. Linear actuator 222 is electromechanically driven by a conventional ball screw 224, best shown in FIGS. 27*a*, 27*b*, and a unique, special ball nut 226. Linear actuator 222 is suitable for use, for example, in single and/or multiple jam-resistant electromechanical actuating systems, such as the actuator system 220 shown in FIG. 30. Once again, it should be understood that jam tolerance cannot be achieved with only one actuator and the more actuators there are in a system, the more jams can be tolerated, e.g., if there are four actuators in the system, up to three jams can be tolerated as there will still be one actuator left to continue operation. Linear actuator 222, is again utilized among other things, for example, for primary and secondary flight surface control, similar to that of GRA 22 of the first embodiment of this invention and includes, as best shown in FIGS. 21*a*, 21*b*, 22 and 25*a*, 25*b*, unique, special ball nut 226, to be described in detail hereinafter, that is normally driven by rotatable ball screw 224, driven in turn by a schematically illustrated (FIG. 30), bidirectionally rotatable prime mover or main motor 24", such as a conventional electric motor which may, if necessary, further include a conventional speed reducer gearbox 70" (again, schematically shown in FIG. 30), with all of the schematically-illustrated items being well known in the art and readily commercially available. For ease of understanding, FIGS. 24*a*-29*a* show the arrangement of the components of linear actuator 222 in the coupled position, while FIGS. 24*b*-29*b* show same in the uncoupled position. The components themselves are the same in the noted two sets of Figures.

As best seen in FIGS. 25-28, it should be understood that the previously-noted ball screw 224, having an input gear 230, extends through an axial central aperture 228 of generally-cylindrical ball nut 226 and is in operative engagement therewith, so that rotation of the ball screw results in axial displacement of the ball nut in the conventional manner. As will be expanded upon later, ball nut 226 is axially retained in an open-ended, diametrically enlarged, stepped, rear cylindrical portion 234 of a generally cylindrical output rod 232 and secured against axial movement, relative to output rod 232, via a ring-shaped closure member 244 affixed to output rod rear portion 234. Output rod 232 further includes a front portion 236 that terminates into a clevis-type member 238 having a central aperture 240 adapted for a further, e.g., pin-type connection. Ball nut 226 is prevented from rotational movement via two opposite, radially outwardly-directed trunnions 246, 248 (FIG. 24), fixedly extending from ball nut 226, through corresponding apertures in output rod 232, at an axial portion thereof proximate to closure member 244. Trunnions 246, 248, in addition to serving for the anti-rotation of ball nut 226 and thus output rod 232, also permit the axial reciprocation of linear actuator 222 in opposed slots in a conventional peripheral actuator housing (not shown).

Turning now to FIG. 21*a*, shown therein is ball screw 224, with input gear 230, extending through the center of ball nut 226. Ball nut 226, on its outer peripheral surface 252, is provided with preferably three peripherally equally angularly spaced, axially-extending, raised portions of generally tooth-like members 254, 256 and 258, each having a front portion "a" axially spaced from a rear portion "b" as well as axially-spaced, dual-angled, generally rectangular, allochiral (or mirror image) end portions 260, 262, which in turn are axially separated by laterally abutting, trapezoidal spaces 264, 266 that share a common, short parallel center axial side.

Turning now to FIGS. 21-29, located around ball nut 226, at spaces 264, 266, is an annular front locking plate 270 having a smooth peripheral outer surface except for the addition of a radially-extending sector face gear portion 272, as well as three equally-spaced, radially inwardly-extending curved sector portions 274*a*, 274*b*, 274*c*, (FIG. 28) each of which merges, at one end, into an axially-extending tooth portion 278 (FIG. 29*a*) having a generally trapezoidal shape adapted to engage, in an operative position, with trapezoidal spaces 266 between tooth-like members 254*a, b*; 256*a, b*; and 258*a, b*, respectively. FIG. 23, and particularly FIG. 22, also show a rear locking plate 270' which is essentially the same as front locking plate 270, only installed in the reversed position (or turned around), with like parts thus being identified with prime (') symbols. Rear locking plate 270', which is circumferentially slightly offset, relative to front locking plate 270, as best seen in FIGS. 20, and 23, has its tooth portions 278' (FIGS. 28*a*, 28*b*) adapted to engage with trapezoidal spaces 268 between tooth-like members 254*a, b*; 256*a, b* and 258*a, b*, respectively. Locking plates 270, 270' are axially separated from each other, as well as from output rod 232 and closure member 244, respectively, via three, spaced and interposed radial thrust, rolling element bearings, such as roller bearings 282, as best seen in FIGS. 23 and 27.

Continuing now, particularly with reference to FIGS. 19 and 24-29, a depending flat portion 280 (FIG. 27) of output rod 232 serves as a mating and attachment surface for the speed reducer gear box 286 of a mode or indexing bidirectional or reversible actuator, such as electric motor 284, the output member of gear box 286 taking the form of a dual radial face mesh gear 290 having oppositely directed gear face portions 292, 292' that operatively respectively mesh with sector face gear portions 272, 272' of locking plates 270, 270'. It should be evident, at this time, that a revolution of mesh gear 290 will, via its opposite face gear portion engagements with locking plate gear portions 272, 272', cause rotations in opposite directions, of locking plates 270, 270' which, in turn, will cause locking plate foot portions 278, 278' to move into and out of engagement, depending upon the direction of rotation of locking plates 270, 270', with ball nut tooth portions 254a, 254b, as well as 256a, 256b and 258a, 258b and thereby alternately coupling and subsequently decoupling ball nut 226 to output rod 232.

Briefly turning now to the operation of linear actuator 222, FIGS. 27a-29a illustrate same during normal operation thereof, i.e., when output rod 232 is mechanically coupled to the grounded housing structure (not shown per se), via the previously-noted intermeshing or coupling of ball nut 226 with the tooth portions 278, 278' of locking plates 270, 270', respectively. Advancing to FIG. 30, in the coupled or engaged stage/state, main motor 24", affixed to a non-illustrated grounded housing portion and acting through a conventional gear box or speed reducer 70", transfers the rotary motion or torque, via rotatable ball screw 224, to axially-retained ball nut 226, thus converting the ball screw's rotary motion to linear, axially reciprocatory movement of the ball nut, depending upon the angular direction of rotation of ball screw 224. As previously-noted, ball nut 226 can be coupled and uncoupled to output rod 232 via disconnect motor 284, gear box 286, face gears 292, 292' and sector gears 272, 272' of locking plates 270, 270', respectively. Output rod 232, in turn, is mechanically interconnected (not shown) to the load, i.e., the movable surface that is controlled therewith.

Figure 30:
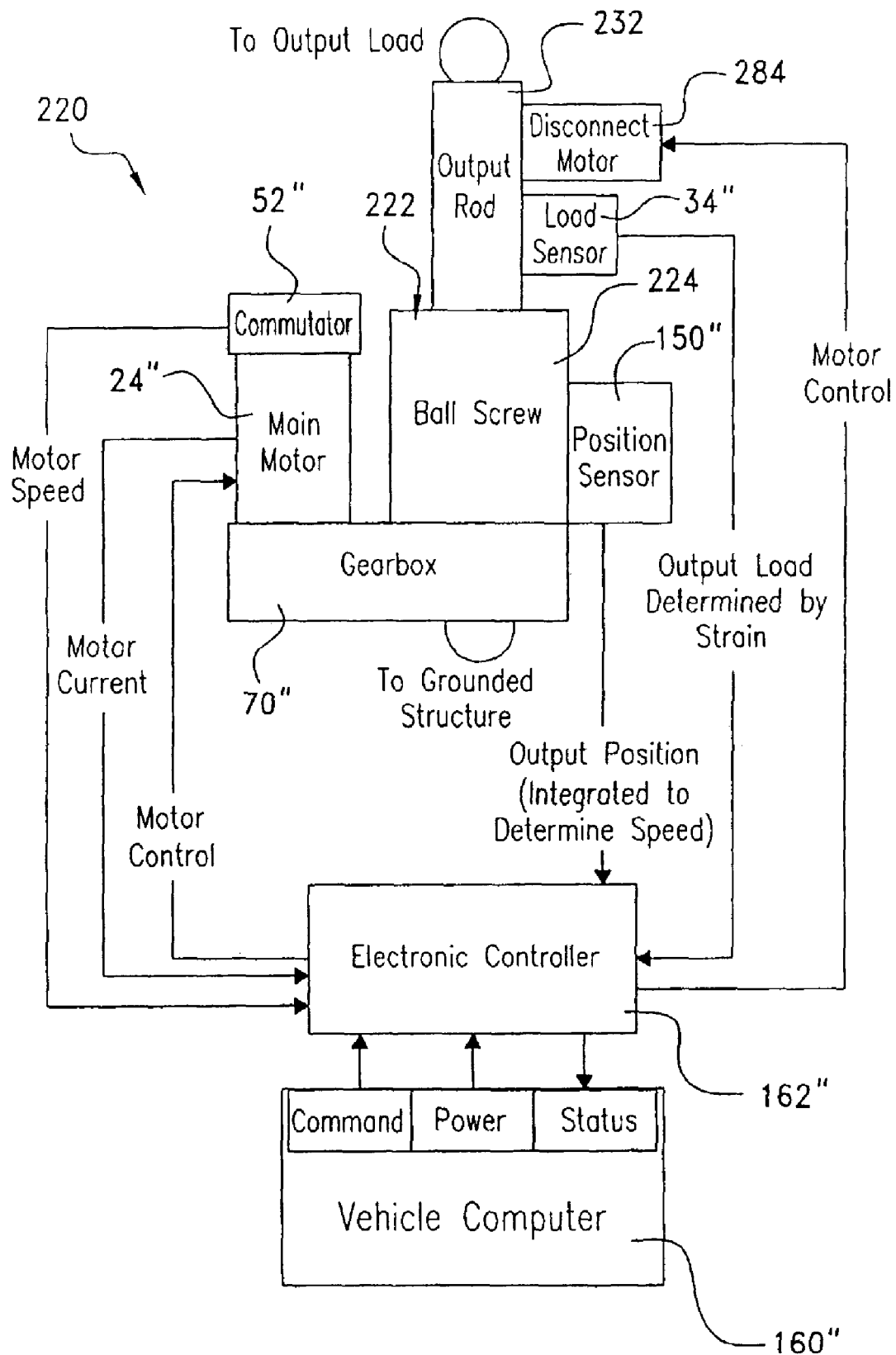
FIG. 30 is a schematic illustration of a second jam tolerant electromechanical actuation system that utilizes the actuator of FIG. 19.

During such normal operational phases, bidirectional main motor 24" operates to move the noted movable surfaces, as directed, as illustrated in FIG. 30, by a vehicle computer 160", acting via Command and Power inputs, through an electronic controller 162", which in turn controls the function of main motor 24" and, as will be discussed later, also controls the function of disconnect motor 284. A Status input relays required information from controller 162" back to vehicle computer 160", with controller 162" receiving at least some of the following inputs from linear actuator 222:

Main Motor Speed from commutator 52";
Main Motor Current from main motor 24";
Linear Actuator Output Load (preferably determined by strain) from load sensor 34"; and
Linear Actuator Output Position (processed, such as by differentiation to determine speed) from position sensor 150".

Upon the detection of a malfunction, such as, for example of a jam or other failure, of linear actuator 222, as determined by electronic controller 162", based on one or more of the just recited linear actuator inputs, decoupling mechanism 128" serves to completely sever the load path between linear actuator 222 and the load. Specifically, decoupling mechanism 128" includes previously-recited face gear 290, driven by reversible/bidirectional disconnect motor 284 via reducer gearbox 286, and locking plates 270, 270'. Opposite rotational movement of locking plates 270, 270', in one direction, causes multiple trapezoidally-shaped tooth portions 278, 278' to uncouple from corresponding trapezoidal spaces 266 between tooth-like members 254a, b; 256a, b; and 258a, b, respectively, which results in complete disengagement of tooth portions 278, 278' from the corresponding trapezoidal spaces 260, 262, between the just noted tooth-like members. It remains a first important feature of this invention that the above decoupling method or process can, of course, also be reversed, at any time, (by driving disconnect motor 284 in a reverse or connect direction) to thereby re-couple the load to linear actuator 222.

In addition, a second important feature of this invention remains that linear actuator 222 is provided with sensing device or strain gage 34" to sense or measure, either directly or indirectly the load present or occurring at output member or rod structure 232. The system control, as illustrated in FIG. 30, can then compare the input load (either by direct or indirect measurement, such as via main motor current, and the like) to the output load, as well as the input speed and the output speed (using position and/or velocity sensors at main motor 24" and the load). This comparison, either by itself or used in conjunction with readings from additional linear actuators can be used to determine if a jam or other type of failure has occurred within linear actuator 222 or its control.

Since the above-recited two main features, namely the load and speed comparisons, allow system 220 to offer the same or similar benefits that have already previously been set forth in the description pertaining to system 20 of the first embodiment of this invention they will thus, for the sake of brevity, not be repeated here. It should also be understood that the several actuators and systems of this invention find utility in all types of applications and vehicles in addition to the noted aircraft applications.

While there are shown and described several preferred embodiments of this invention, it is to be distinctly understood that the invention is not limited thereto, but may be otherwise variously embodied and practiced within the scope of the following claims.

The invention claimed is:

1. An electromechanical actuator assembly, comprising:
an actuator for attachment to a control surface,
a load path for transferring control-surface motion to the actuator,
a decoupling mechanism including engagable and disengageable members that when engaged to one another control-surface motion is transferred to the actuator and when disengaged from one another upon detection of a malfunction the load path is severed,
a motor providing decoupling motion, and
a gear for transferring decoupling motion to the decoupling mechanism wherein, when the gear is rotated in a decoupling direction, the members of the decoupling mechanism are disengaged from one another to sever the load path upon detection of a malfunction.

2. An electromechanical actuator assembly as set forth in claim 1, wherein the load path comprises a ballscrew and a ballnut that moves linearly in response to rotational movement of the ballscrew.

3. An electromechanical actuator assembly as set forth in claim 2, wherein the ballnut is decoupled from an output rod of the actuator by the decoupling mechanism upon detection of the malfunction.

4. An electromechanical actuator assembly as set forth in claim 1, wherein the decoupling mechanism is a coupling/decoupling mechanism that can also couple the load path to transfer control-surface motion to the actuator.

5. An electromechanical actuator assembly as set forth in claim 4, wherein when the gear is rotated in a coupling direction, opposite the decoupling direction, the members of the coupling/decoupling mechanism are engaged to one another to couple the load path.

6. An electromechanical actuator assembly as set forth in claim 5, wherein the load path comprises a ballscrew and a ballnut that moves linearly in response to rotational movement of the ballscrew.

7. An electromechanical actuator assembly as set forth in claim 6, wherein the ballnut is decoupled from the actuator by the decoupling mechanism upon detection of the malfunction.

8. A method of testing the electromechanical actuator assembly set forth in claim 7, said method comprising the steps of rotating the gear in the decoupling direction to confirm decoupling of coupling/decoupling mechanism and thereafter driving the gear in the coupling direction to reestablish the load path for operation.

9. In combination, a control surface and a pair of the electromechanical actuator assemblies set forth in claim 1, wherein both actuators are attached to the control surface whereby, upon decoupling of one load path upon detection of the malfunction, the control-surface motion can still be provided through the other load path.

10. In combination, a controller and the electromechanical actuator assembly set forth in claim 1, wherein the controller controls the rotation of the gear.

11. The combination set forth in claim 10, further comprising a computer, and wherein the controller relays data regarding input-output loads to the computer, and wherein the computer compares this data to detect a malfunction.

12. A vehicle comprising a control surface and the electromechanical actuator assembly set forth in claim 1, wherein the control surface is attached to the actuator and moves in response to control-surface motion transferred through the load path.

13. A vehicle as set forth in claim 12, wherein the vehicle is an aircraft.

14. A vehicle as set forth in claim 13, wherein the control surface is a primary control surface.

15. A vehicle as set forth in claim 13, wherein the control surface is a secondary control surface.

16. A method of testing the electromechanical actuator assembly in the vehicle set forth in claim 13, said method comprising the steps of driving the gear in the decoupling direction to confirm decoupling of the decoupling mechanism and thereafter driving the gear in the opposite direction to reestablish the load path for operation.

17. A method of testing as set forth in claim 16, wherein said steps are performed prior to each flight.

18. An aircraft comprising a control surface and a pair of the electromechanical actuator assemblies set forth in claim 1, wherein the control surface is attached to both actuators, whereby, upon decoupling of one load path upon detection of the malfunction, the control-surface motion can still be provided through the other load path.

19. An electromechanical actuator assembly, comprising:
   an actuator for attachment to a control surface,
   a load path for transferring control-surface motion to the actuator,
   a coupling/decoupling mechanism for severing the load path upon detection of a malfunction and that can also couple the load path to transfer control-surface motion to the actuator,
   a motor providing decoupling motion, and
   a gear for transferring decoupling motion to the decoupling mechanism wherein, when the gear is rotated in a decoupling direction, the decoupling mechanism severs the load path upon detection of a malfunction, and wherein, the gear is rotated in a coupling direction, opposite the decoupling direction, to couple the load path.

20. A method of testing an electromechanical actuator assembly in an aircraft having a control surface, the electromechanical actuator assembly including an actuator for attachment to the control surface, a load path for transferring control-surface motion to the actuator wherein the control surface is attached to the actuator and moves in response to control-surface motion transferred through the load path, a decoupling mechanism for severing the load path upon detection of a malfunction, a motor providing decoupling motion, and a gear for transferring decoupling motion to the decoupling mechanism wherein, when the gear is rotated in a decoupling direction, the decoupling mechanism severs the load path upon detection of a malfunction, said method comprising the steps of:
   driving the gear in the decoupling direction to confirm decoupling of the decoupling mechanism, and thereafter
   driving the gear in the opposite direction to reestablish the load path for operation.

* * * * *